United States Patent
Heinz et al.

(10) Patent No.: US 11,358,531 B2
(45) Date of Patent: Jun. 14, 2022

(54) MULTIFUNCTIONAL CENTER CONSOLE SYSTEM FOR A VEHICLE

(71) Applicant: MOTHERSON INNOVATIONS COMPANY LIMITED, London (GB)

(72) Inventors: Christoph Heinz, Bötzingen (DE); Eric Nogaret, Bötzingen (DE)

(73) Assignee: Motherson Innovations Company Limited, London (GB)

( * ) Notice: Subject to any disclaimer, the term of this patent is extended or adjusted under 35 U.S.C. 154(b) by 309 days.

(21) Appl. No.: 16/740,872

(22) Filed: Jan. 13, 2020

(65) Prior Publication Data

US 2020/0223366 A1    Jul. 16, 2020

Related U.S. Application Data

(60) Provisional application No. 62/791,893, filed on Jan. 14, 2019.

(51) Int. Cl.
*B60R 7/04* (2006.01)
*E05B 47/00* (2006.01)
(Continued)

(52) U.S. Cl.
CPC ............ *B60R 7/04* (2013.01); *E05B 47/0002* (2013.01); *B60H 1/00564* (2013.01); *B60N 2/793* (2018.02); *B60N 3/001* (2013.01); *B60N 3/10* (2013.01); *B60N 3/18* (2013.01); *B60Q 3/225* (2017.02); *B60R 11/0217* (2013.01); *B60R 16/03* (2013.01); *B60R 2011/0007* (2013.01); *B60S 1/64* (2013.01)

(58) Field of Classification Search
CPC ..................................................... B60R 7/04
USPC ............................................. 296/24.34, 37.8
See application file for complete search history.

(56) References Cited

U.S. PATENT DOCUMENTS

| 7,029,048 B1 | 4/2006 | Hicks et al. |
| 2007/0069541 A1 | 3/2007 | Sturt et al. |
| 2008/0007079 A1 | 1/2008 | Sturt et al. |

FOREIGN PATENT DOCUMENTS

| DE | 10334999 A1 * | 2/2005 | ........... B60N 2/4646 |
| JP | 2014-058271 A | 4/2014 | |
| JP | WO2016067670 A1 * | 5/2016 | ............... B60K 1/04 |

OTHER PUBLICATIONS

European Search Report dated Mar. 19, 2020 of EP application No. 20151732.

* cited by examiner

*Primary Examiner* — Dennis H Pedder
(74) *Attorney, Agent, or Firm* — Jones Day

(57) ABSTRACT

A multifunctional center console system for a vehicle is disclosed. The multifunctional center console system includes a multifunctional center console, which may include a main body configured to be mounted to a vehicle within an interior of the vehicle. The main body of the multifunctional center console may have at least top, bottom, front and rear portions and first and second side portions disposed between at least the front and rear portions. The multifunctional center console may further include at least one portable body configured to be removably attached to the main body. The at least one portable body of the multifunctional center console may have at least top, bottom, front and rear portions and first and second side portions disposed between at least the front and rear portions. The at least one portable body of the multifunctional center console may include at least one functional feature.

26 Claims, 23 Drawing Sheets

(51) Int. Cl.
*B60Q 3/225* (2017.01)
*B60N 2/75* (2018.01)
*B60H 1/00* (2006.01)
*B60N 3/00* (2006.01)
*B60N 3/10* (2006.01)
*B60N 3/18* (2006.01)
*B60R 11/02* (2006.01)
*B60R 16/03* (2006.01)
*B60R 11/00* (2006.01)
*B60S 1/64* (2006.01)

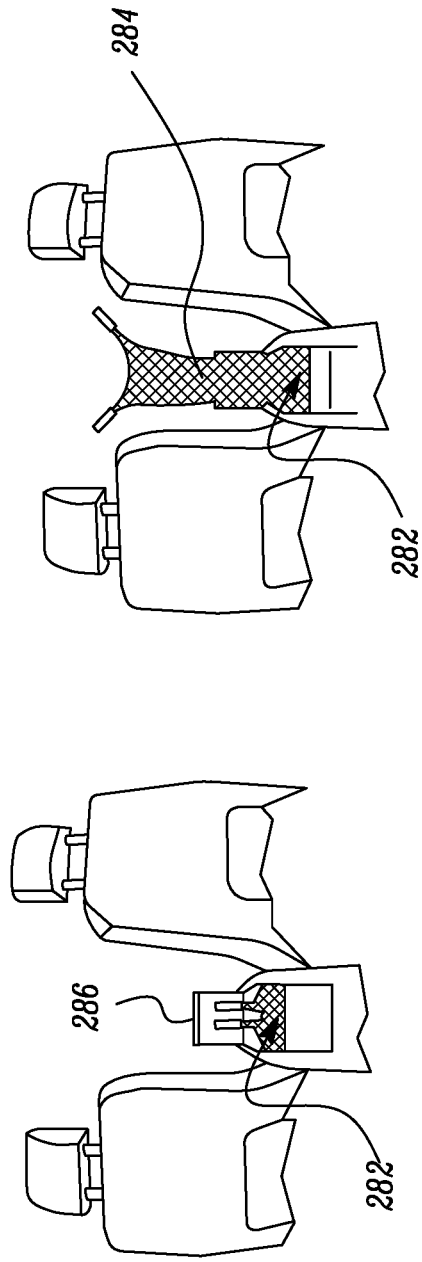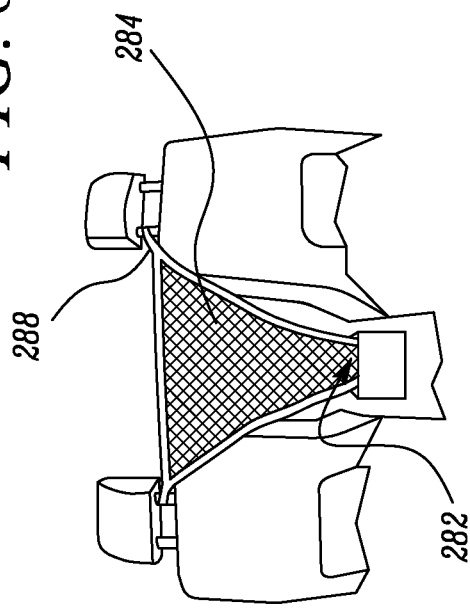

MULTIFUNCTIONAL CENTER CONSOLE SYSTEM FOR A VEHICLE

CROSS REFERENCE TO RELATED APPLICATION

This application claims priority to U.S. Provisional Application No. 62/791,893, filed on Jan. 14, 2019, and titled "Multifunctional Center Console System for a Vehicle," the entirety of which is incorporated herein by reference.

TECHNICAL FIELD

The present disclosure relates generally to interior components for vehicles and, more particularly, to a multifunctional center console system for a vehicle.

BACKGROUND

Vehicles, such as passenger cars, vans and trucks, often include one or more center consoles typically located between two or more seats in an interior of the vehicle. Such center consoles in vehicles may include at least some functional features which provide various functionalities to drivers and/or passengers.

Due to various factors such as cost, vehicle type, vehicle size and packaging requirements of components in the interior of the vehicle, the overall number of functional features which a particular center console may include is often rather limited. Furthermore, the functional features which a particular center console may include are typically unable to be easily moved or modified (e.g. customized) and thus are relatively permanent. As such, many center consoles in vehicles often fail to include an adequate number of functional features, or a preferred/desired combination of functional features, to sufficiently meet the particular needs and preferences of different drivers and/or passengers. Such particular needs and preferences of different drivers and/or passengers may relate to variables such as the location where a vehicle is being used (e.g. urban or rural environments), the purpose for which a vehicle is being used (e.g. short commutes, long commutes, recreational use, commercial use, etc.), the desired trim level of a vehicle (e.g. luxury, sport, economy, etc.), the ages of the drivers and/or passengers (e.g. older adults, younger adults, children, infants, etc.) and the types of devices (e.g. portable electronic devices) which may be used by the drivers and/or passengers while occupying a vehicle. Therefore, as vehicle manufacturers continue to seek ways to enhance overall in-vehicle experience, sufficiently meeting or exceeding such particular needs and preferences of the different drivers and/or passengers also continues to be a high priority.

With the aforementioned challenges and limitations in mind, there is a continuing unaddressed need for a center console for a vehicle which may be highly customizable to include an increased number of functional features and/or various combinations of functional features, such that the center console is more capable of sufficiently meeting or exceeding the particular needs and preferences of different drivers and/or passengers, thus further enhancing the overall in-vehicle experience for the different drivers and/or passengers.

SUMMARY OF THE DISCLOSURE

At least the above-identified need is met with the present disclosure. One aspect of this disclosure is directed to a multifunctional center console system for a vehicle. The multifunctional center console system includes a multifunctional center console. The multifunctional center console may include a main body configured to be mounted to a vehicle within an interior of the vehicle. The main body of the multifunctional center console may have at least a top portion, a bottom portion, a front portion, a rear portion and first and second side portions disposed between at least the front and rear portions. The multifunctional center console may further include at least one portable body configured to be removably attached to the main body of the multifunctional center console. The at least one portable body of the multifunctional center console may have at least a top portion, a bottom portion, a front portion, a rear portion and first and second side portions disposed between at least the front and rear portions of the at least one portable body. The at least one portable body may include at least one functional feature.

The rear portion of the main body of the multifunctional center console may be configured to receive at least a part of the at least one portable body of the multifunctional center console therein.

A rear opening defined at the rear portion of the main body of the multifunctional center console may be configured to receive at least a part of the front portion of the at least one portable body of the multifunctional center console therein.

At least a part of the at least one portable body of the multifunctional center console may be configured to be inserted into a rear opening extending through at least the rear portion of the main body of the multifunctional center console.

The main body and the at least one portable body of the multifunctional center console may be configured such that, in order to removably attach the at least one portable body to the main body, the least one portable body may be further configured to be (1) at least partially inserted and positioned into a rear opening extending through at least the rear portion of the main body and (2) further rotated towards the main body in a generally upward and forward direction of the vehicle until the at least one portable body is removably attached to the main body.

The front portion of the at least one portable body of the multifunctional center console may be configured to be removably attached to the rear portion of the main body of the multifunctional center console such that, when the front portion of the at least one portable body is removably attached to the rear portion of the main body, at least some outer surfaces of the at least one portable body and at least some outer surfaces of the main body may be disposed immediately adjacent and substantially flush relative to each other.

The front portion of the at least one portable body of the multifunctional center console may be configured to be removably attached to the rear portion of the main body of the multifunctional center console such that, when the front portion of the at least one portable body is removably attached to the rear portion of the main body, a rearmost outer surface of the rear portion of the at least one portable body may be disposed substantially rearward of the rear portion of the main body.

An overall vertical height of the main body of the multifunctional center console and an overall vertical height of the at least one portable body of the multifunctional center console may be substantially equal.

An overall lateral width of the main body of the multifunctional center console, in a side-to-side direction of the vehicle, and an overall lateral width of the at least one portable body of the multifunctional center console, in the side-to-side direction of the vehicle, may be substantially equal.

The main body of the multifunctional center console may include at least one functional feature which is different from the at least one functional feature of the at least one portable body of the multifunctional center console.

The at least one functional feature of the main body of the multifunctional center console may include at least one of an armrest, a cup holder, a storage compartment, a coin holder, ambient lighting, LED lighting, a vehicle sensor, a vehicle HVAC component, a vehicle electrical component, a vehicle gear selector, a vehicle infotainment system control feature, a vehicle audio/video component, a speaker, a portable electronic device holder, a USB port, an electrical receptacle, a wireless charging pad, a coffee maker, a utility tray, a utility table, a docking system for mobile devices, an integrated vacuum device, and a wireless power transmission system antenna array.

The at least one functional feature of the main body of the multifunctional center console may include at least one movable armrest disposed at or near at least the top portion of the main body.

The at least one functional feature of the at least one portable body of the multifunctional center console may include at least one of a carrying handle, a cup holder, a side-mounted storage pocket, a cargo-retaining strap, an elastic cargo-retaining band, a storage compartment, a lockable/unlockable safe, a storage drawer, an openable/closable access cover, ambient lighting, LED lighting, a vehicle HVAC component, a vehicle HVAC vent, a climate control feature, a heated seat control feature, a vehicle electrical component, a vehicle audio/video component, a speaker, a display screen, a vehicle infotainment system control feature, a portable electronic device holder, a USB port, an electrical receptacle, a wireless charging pad, a coffee maker, a utility tray, a utility table, a docking system for mobile devices, an integrated vacuum device, and a wireless power transmission system antenna array.

The at least one functional feature of the at least one portable body of the multifunctional center console may be configured to receive electrical power and be fully functional when the at least one portable body is removed from the main body of the multifunctional center console. The at least one functional feature of the at least one portable body may be further configured to receive the electrical power from at least one of an external power source electrically connected to the at least one portable body and an internal rechargeable power source provided at least partially within the at least one portable body.

The at least one functional feature of the at least one portable body of the multifunctional center console may include at least one storage compartment including at least one protective liner installed therein. The at least one protective liner may be configured to be selectively removed from the at least one storage compartment so as to cover and protect at least one interior component and/or at least one cargo area within the interior of the vehicle.

The at least one functional feature of the at least one portable body of the multifunctional center console may include at least one storage compartment including netting installed therein. The netting may be configured to be selectively removed from the at least one storage compartment so as to be removably attachable to at least one interior component of the vehicle.

The main body and the at least one portable body of the multifunctional center console may each include corresponding HVAC duct portions configured to align with and engage each other when the at least one portable body is removably attached to the main body of the multifunctional center console.

The main body and the at least one portable body of the multifunctional center console may each include corresponding electrical connectors configured to align with and engage each other when the at least one portable body is removably attached to the main body of the multifunctional center console.

The multifunctional center console may further include a locking/unlocking assembly configured to lock and selectively unlock the at least one portable body of the multifunctional center console to and from the main body of the multifunctional center console when the at least one portable body is removably attached to the main body. The locking/unlocking assembly may include at least one movable locking feature disposed at least partially within the main body and at least one stationary receiving feature disposed on the at least one portable body. The at least one movable locking feature may be configured to engage the at least one stationary receiving feature when the at least one portable body is removably attached to the main body, thereby locking the at least one portable body to the main body.

The multifunctional center console may further include an electromagnetic locking/unlocking assembly configured to lock and selectively unlock the at least one portable body of the multifunctional center console to and from the main body of the multifunctional center console when the at least one portable body is removably attached to the main body.

The electromagnetic locking/unlocking assembly may include at least one movable electromagnetically-operated locking feature disposed at least partially within the main body of the multifunctional center console and at least one stationary receiving feature disposed on the at least one portable body of the multifunctional center console.

The at least one movable electromagnetically-operated locking feature may be configured to (1) slide on the at least one stationary receiving feature as the at least one portable body initially engages the main body and (2) further engage into the at least one stationary receiving feature when the at least one portable body fully engages the main body to be removably attached to the main body, thereby locking the at least one portable body to the main body when the at least one portable body is removably attached to the main body.

The at least one movable electromagnetically-operated locking feature of the electromagnetic locking/unlocking assembly may be further configured to retract in response to a key or fob being selectively placed in proximity to a wireless receiver operatively connected with the electromagnetic locking/unlocking assembly, thereby disengaging the at least one movable electromagnetically-operated locking feature from the at least one stationary receiving feature and selectively unlocking the at least one portable body of the multifunctional center console from the main body of the multifunctional center console.

The electromagnetic locking/unlocking assembly may be further configured to selectively unlock the at least one portable body of the multifunctional center console from the main body of the multifunctional center console in response to a key or fob being selectively placed in proximity to a wireless receiver operatively connected with the electromagnetic locking/unlocking assembly.

The multifunctional center console system may further include at least one portable storage case for holding, storing and/or transporting the at least one portable body of the multifunctional center console when the at least one portable body is removed from the main body of the multifunctional center console.

The at least one portable body of the multifunctional center console may include a plurality of interchangeable portable bodies. Each of the plurality of interchangeable portable bodies of the multifunctional center console may be configured to be removably attached, one at a given time, to the main body of the multifunctional center console. Each of the plurality of interchangeable portable bodies may include at least one functional feature.

The multifunctional center console system may further include at least one portable storage case for holding, storing and/or transporting at least one of the plurality of interchangeable portable bodies of the multifunctional center console when the at least one of the plurality of interchangeable portable bodies is removed from the main body of the multifunctional center console.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

FIGS. 8A, 8B and 8C provide rear views of seats within a vehicle interior, illustrating various stages of the netting being removed from the second storage compartment of the portable body shown in FIGS. 3-5 and 7 so as to be removably attached to respective headrests on the seats;

DETAILED DESCRIPTION

Figure 1:
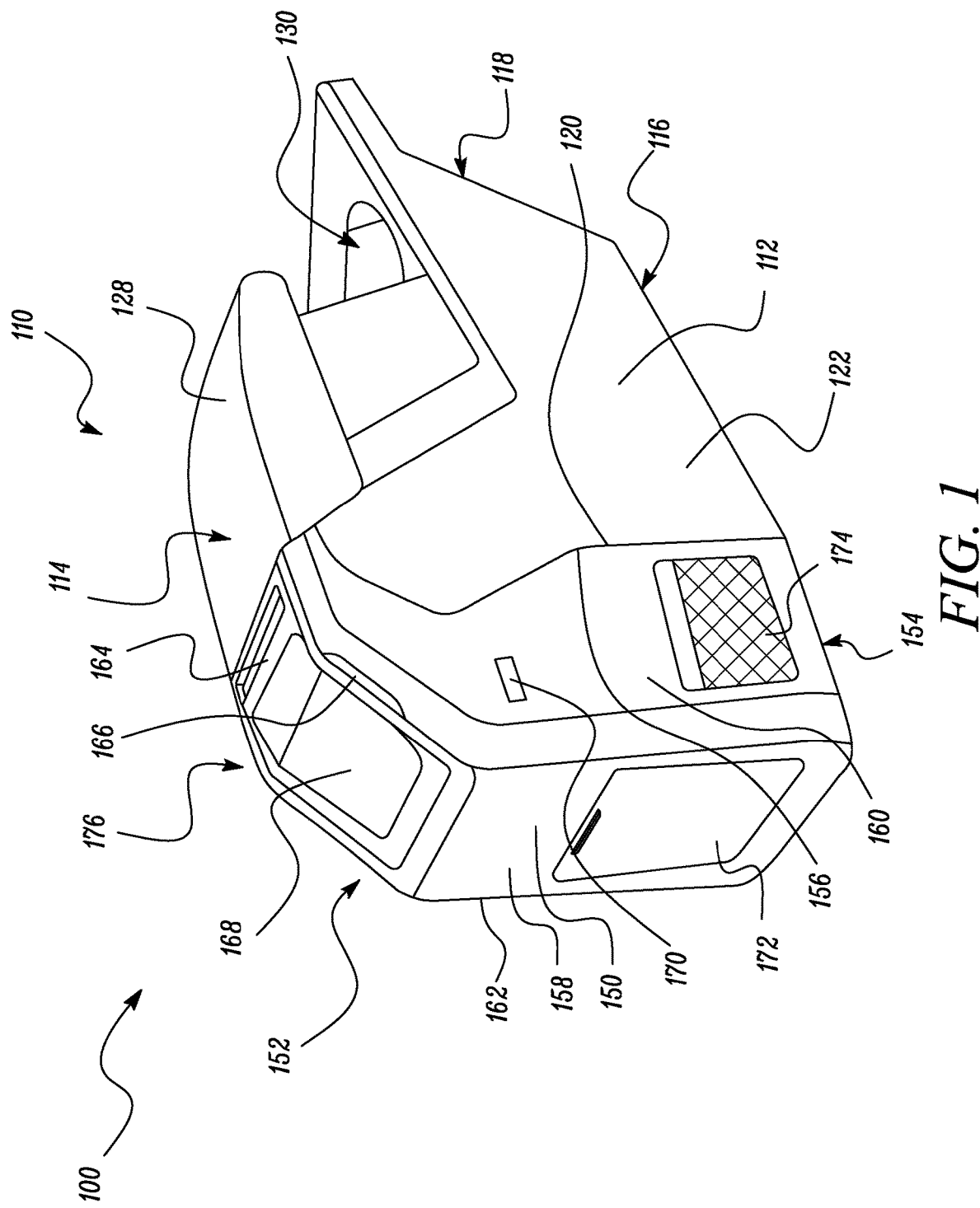
FIG. 1 is a rear perspective view of an exemplary multifunctional center console for a vehicle, illustrating an exemplary portable body of the multifunctional center console removably attached to an exemplary main body of the multifunctional center console.

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Additionally, various terms and/or phrases describing or indicating a position or directional reference such as "top", "bottom", "front", "rear", "forward", "rearward", "end", etc. may relate to one or more particular components as seen generally from a user's vantage point during use or operation, and/or as positioned relative to a forward/rearward, front-to-back or side-to-side direction of a vehicle, and such terms and/or phrases are not to be interpreted as limiting, but merely as a representative basis for describing the disclosure to one skilled in the art.

Referring to the figures, an exemplary multifunctional center console system 100 for a vehicle according to the present disclosure is shown and described. As non-limiting examples, such vehicles which may employ the multifunctional center console system 100 may include various motor vehicles (e.g. passenger cars, vans, trucks and heavy machinery), watercraft (e.g. motorboats, commercial boats, sailboats and cruise ships), aircraft (e.g. light aircraft and airliners) and any other vehicles capable of transporting drivers (operators) and/or passengers therein.

FIGS. 1-18 provide several views collectively illustrating the exemplary multifunctional center console system 100 for a vehicle. The multifunctional center console system 100 may include one or more multifunctional center consoles, such as, but not limited to, the exemplary multifunctional center console 110 shown in at least FIGS. 1-10, 12, 14, 16, 17 and 18. The multifunctional center console 110 may include a main body 112 which may be fixedly or movably mounted to a vehicle (e.g. on a vehicle floor) within an interior of the vehicle (as shown in FIGS. 6A-6C, 8A-8C, 10 and 12). Once mounted to the vehicle, the main body 112 of the multifunctional center console 110 may extend generally longitudinally in a front-to-back direction D of the vehicle. The main body 112 may have at least a top portion 114, a bottom portion 116, a front portion 118, a rear portion 120 and first and second side portions 122, 124 (FIGS. 17 and 18) disposed between at least the front and rear portions 118, 120. The main body 112 may include at least one support structure 126 (partially shown in FIGS. 16-18) disposed substantially within and/or beneath the main body 112. As non-limiting examples, the at least one support structure 126 may include at least one or more of a frame, shell structure, rails, etc. for providing overall structural support to the main body 112 and/or for mounting the main body 112 to the vehicle (e.g. by way of various types of fasteners and/or other securing means). The at least one support structure 126 may be made from any suitable material such as, but not limited to, metal materials (e.g. stamped or die-cast metals), polymeric materials (e.g. 3D-printed plastics or carbon fiber reinforced injection molded plastics), various composite materials and combination of these aforementioned materials, as may be understood by one of ordinary skill. Furthermore, as non-limiting examples, the outermost structure of the main body 112, as shown in at least FIGS. 1-10, 12, 14, 16, 17 and 18, may include one or more shells, panels and/or skins. The outermost structure of the main body 112 may be made from any suitable material, such as, but not limited to, polymeric materials (e.g. 3D-printed plastics, injection molded plastics or carbon fiber reinforced injection molded plastics), various composite materials and combination of these aforementioned materials. Furthermore, the outermost structure of the main body 112 may additionally include external decorative texture, soft skin material layers (e.g. leather, leatherette, vinyl, etc.) and/or other external surface elements, as may be understood by one of ordinary skill.

Additionally, the main body 112 of the multifunctional center console 110 may further include at least one functional feature for providing additional functionality to the vehicle, as well as for providing drivers and/or passengers of the vehicle with additional functionality, comfort and convenience to enhance overall in-vehicle experience. As non-limiting examples, the at least one functional feature of the main body 112 of the multifunctional center console 110 may include at least one or more of an armrest, a cup holder, a storage compartment, a coin holder, ambient lighting, LED lighting, a vehicle sensor, a vehicle HVAC component, a vehicle electrical component, a vehicle gear selector, a vehicle infotainment system control feature, a vehicle audio/video component, a speaker, a portable electronic device holder, a USB port, an electrical receptacle, a wireless charging pad (e.g. inductive charging pad), and a wireless power transmission system antenna array (e.g. as disclosed in U.S. Patent Application Publication No. 2017/0179766 A1, by Ossia, Inc. or U.S. Patent Application Publication No. 2018/0262050A1, by Yank Technologies, Inc.).

In the example shown in FIGS. 1-10, 12, 14, 16, 17 and 18, the at least one functional feature of the main body 112 of the multifunctional center console 110 includes a movable armrest 128 (e.g. pivotable and/or forwardly-rearwardly adjustable), disposed at or near at least the top portion 114 of the main body 112, and one or more cup holders 130 disposed at or near the front portion 118 of the main body 112, as may be understood by one of ordinary skill. Additionally, at least one storage compartment (not shown) may be disposed within the main body 112 beneath the movable armrest 128 and may be accessible by selectively moving the movable armrest 128. It is to be understood, however, that the movable armrest 128 and the one or more cup holders 130 are merely shown as examples, and the main body 112 may include additional functional features, less functional features and/or entirely different combinations of functional features, such as one or more of those previously described herein. Additional aspects of the main body 112 of the multifunctional center console 110 will be further described herein in greater detail when describing other aspects of the multifunctional center console 110.

Additionally, the multifunctional center console 110 may further include at least one portable body, such as, but not limited to, one or more of the exemplary portable bodies 150, 250, 350, 450, 550 shown throughout FIGS. 1-18. As will be further described herein in greater detail, each of the portable bodies 150, 250, 350, 450, 550 of the multifunctional center console 110 may be interchangeable and removably attached, one at a given time, to the main body 112 of the multifunctional center console 110. As shown throughout FIGS. 1-18, each of the portable bodies 150, 250, 350, 450, 550 may have at least a top portion 152, 252, 352, 452, 552, a bottom portion 154, 254, 354, 454, 554, a front portion 156, 256, 356, 456, 556, a rear portion 158, 258, 358, 458, 558 and first and second side portions 160, 260, 360, 460, 560 and 162, 262, 362, 462, 562 disposed between at least the front and rear portions 156, 256, 356, 456, 556 and 158, 258, 358, 458, 558. Furthermore as non-limiting examples, the basic overall structure of each of the portable bodies 150, 250, 350, 450, 550 of the multifunctional center console 110 may be made from any suitable material, such as, but not limited to, metal materials, wood materials, polymeric materials (e.g. 3D-printed plastics, injection molded plastics or carbon fiber reinforced injection molded plastics), various composite materials and combination of these aforementioned materials. Preferably, each of the portable bodies 150, 250, 350, 450, 550 are constructed to be as light weight as possible so as to provide for easier, more convenient portability (e.g. carrying and transporting when removed from the main body 112 of the multifunctional center console 110). Furthermore, each of the portable bodies 150, 250, 350, 450, 550 of the multifunctional center console 110 may additionally include external decorative texture, soft skin material layers (e.g. leather, leatherette, vinyl, etc.) and/or other external surface elements, as may be understood by one of ordinary skill.

Additionally, each of the portable bodies 150, 250, 350, 450, 550 of the multifunctional center console 110 may include at least one functional feature (which may be different from the at least one function feature of the main body 112 of the multifunctional center console 110 and vice versa) for providing additional functionality to the vehicle, as well as for providing drivers and/or passengers of the vehicle with additional functionality, comfort and convenience to enhance overall in-vehicle experience.

Figure 2:
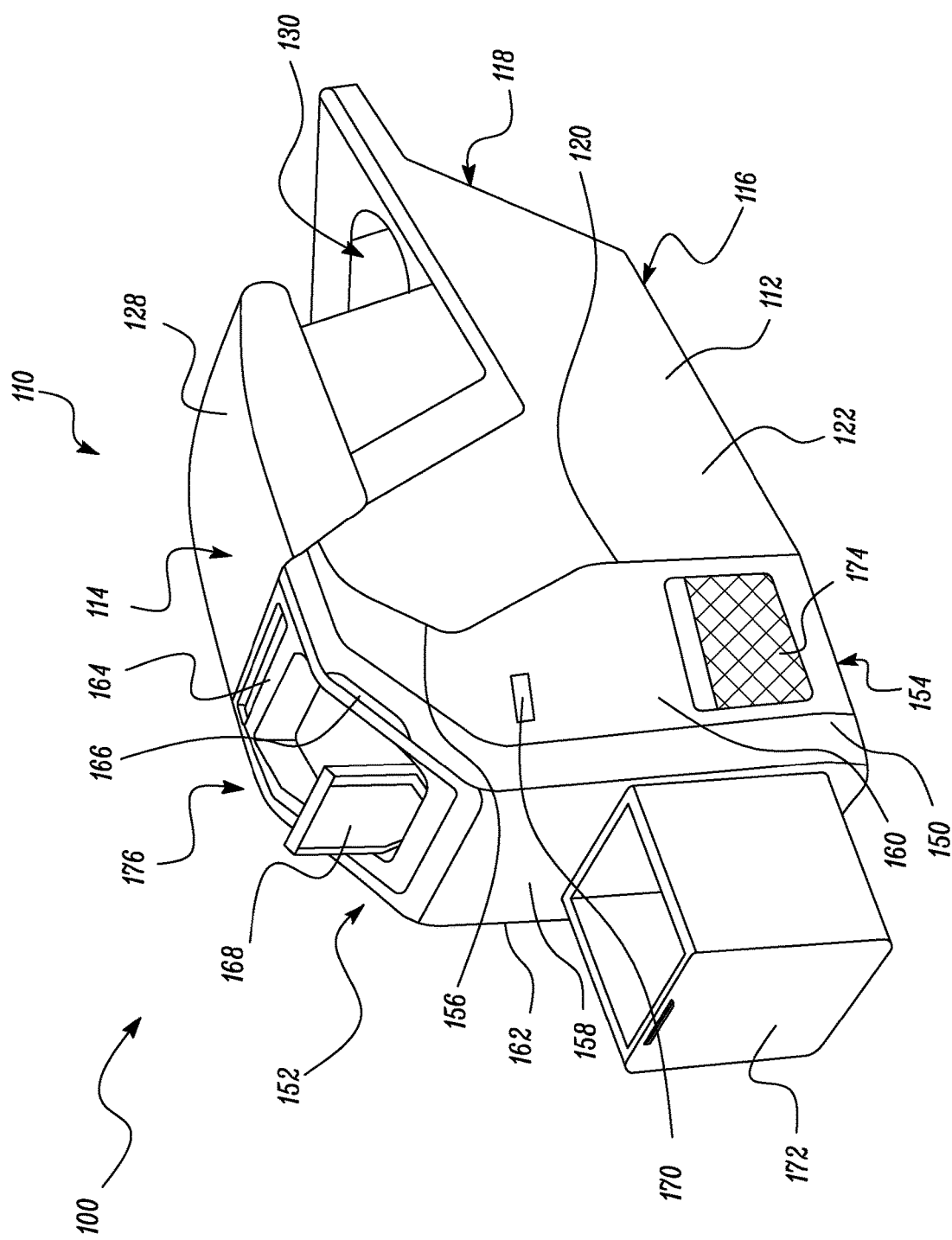
FIG. 2 is a rear perspective view of the multifunctional center console, further illustrating different configurations or uses of various functional features of the portable body shown in FIG. 1.
Figure 3:
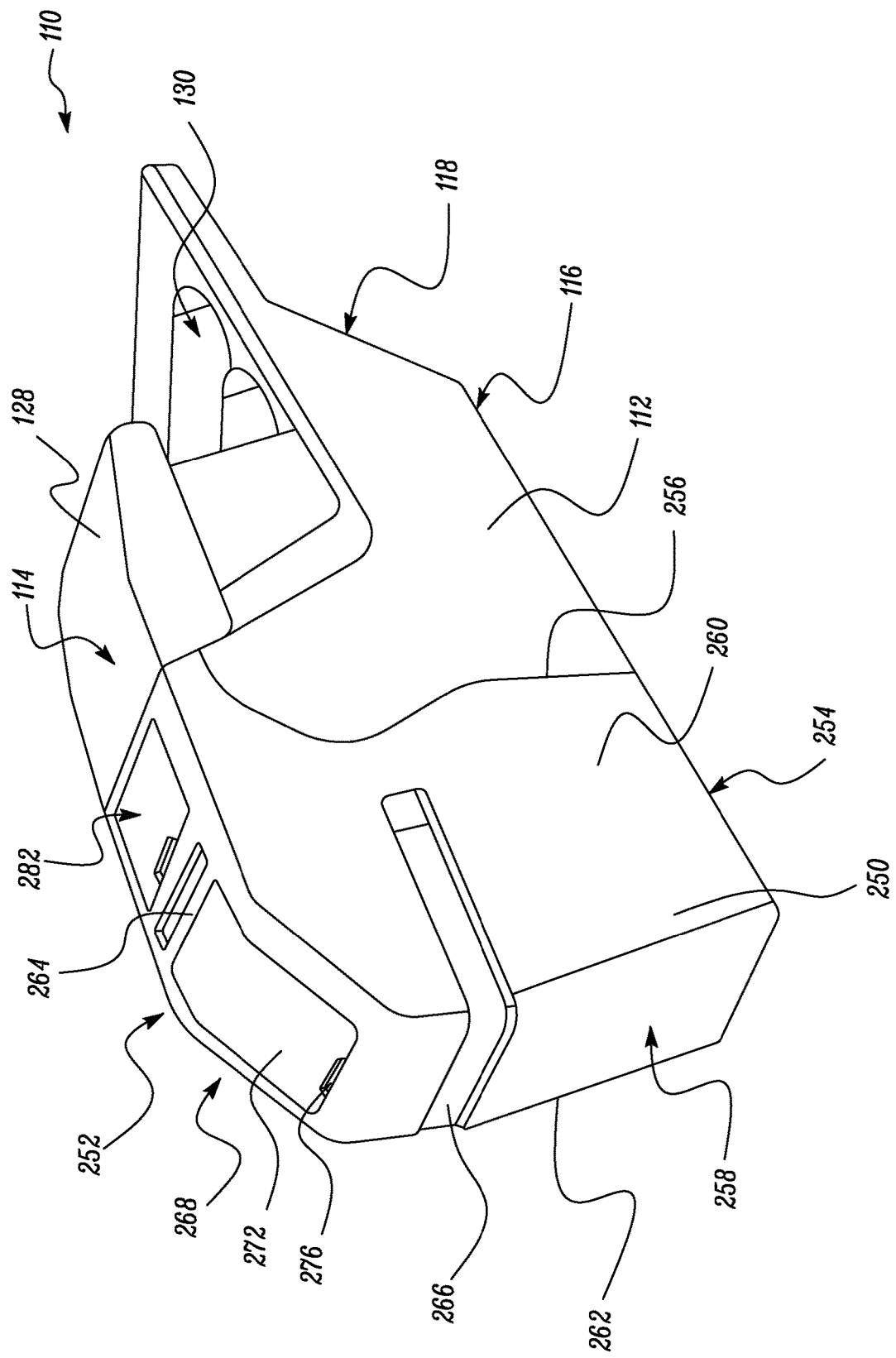
FIG. 3 is a rear perspective view of the multifunctional center console, illustrating another exemplary portable body of the multifunctional center console removably attached to the main body of the multifunctional center console.
Figure 4:
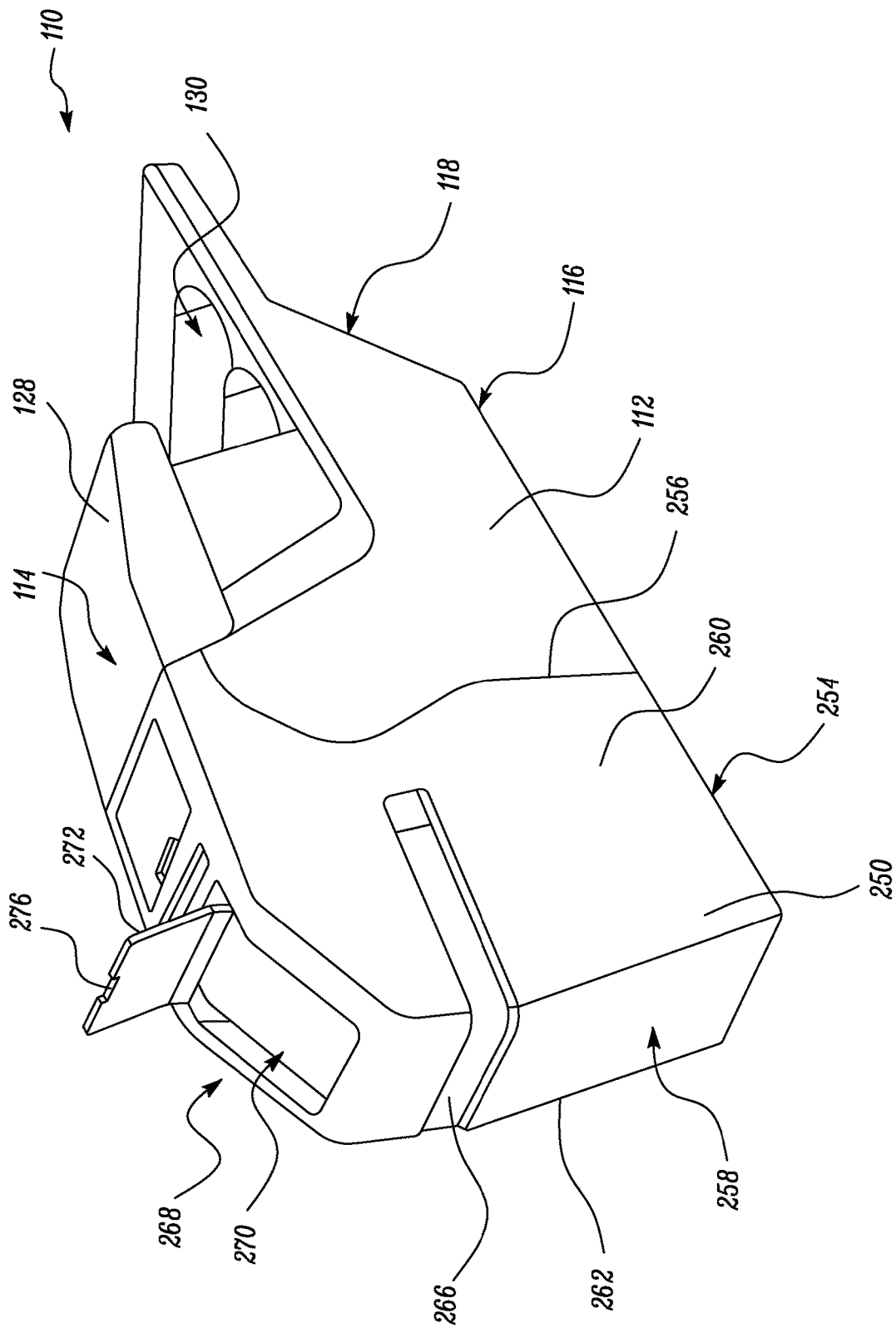
FIG. 4 is a rear perspective view of the multifunctional center console, further illustrating the portable body shown in FIG. 3 with a first access cover displaced into an open position so as to access a protective liner stored within a first storage compartment of the portable body.
Figure 5:
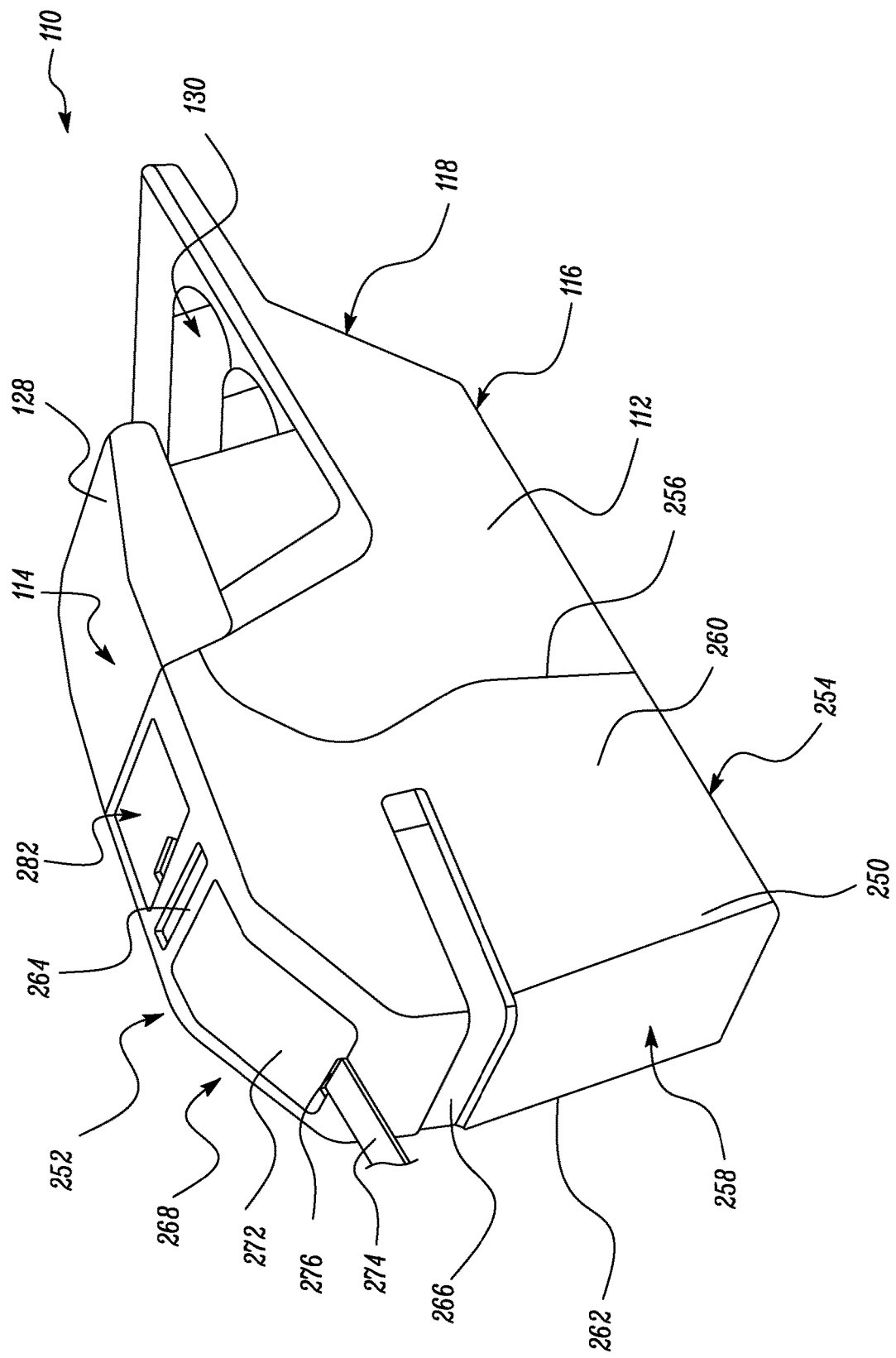
FIG. 5 is a rear perspective view of the multifunctional center console, further illustrating the portable body shown in FIGS. 3 and 4 with the protective liner removed from the first storage compartment and the first access cover displaced into a closed position.
Figure 17:
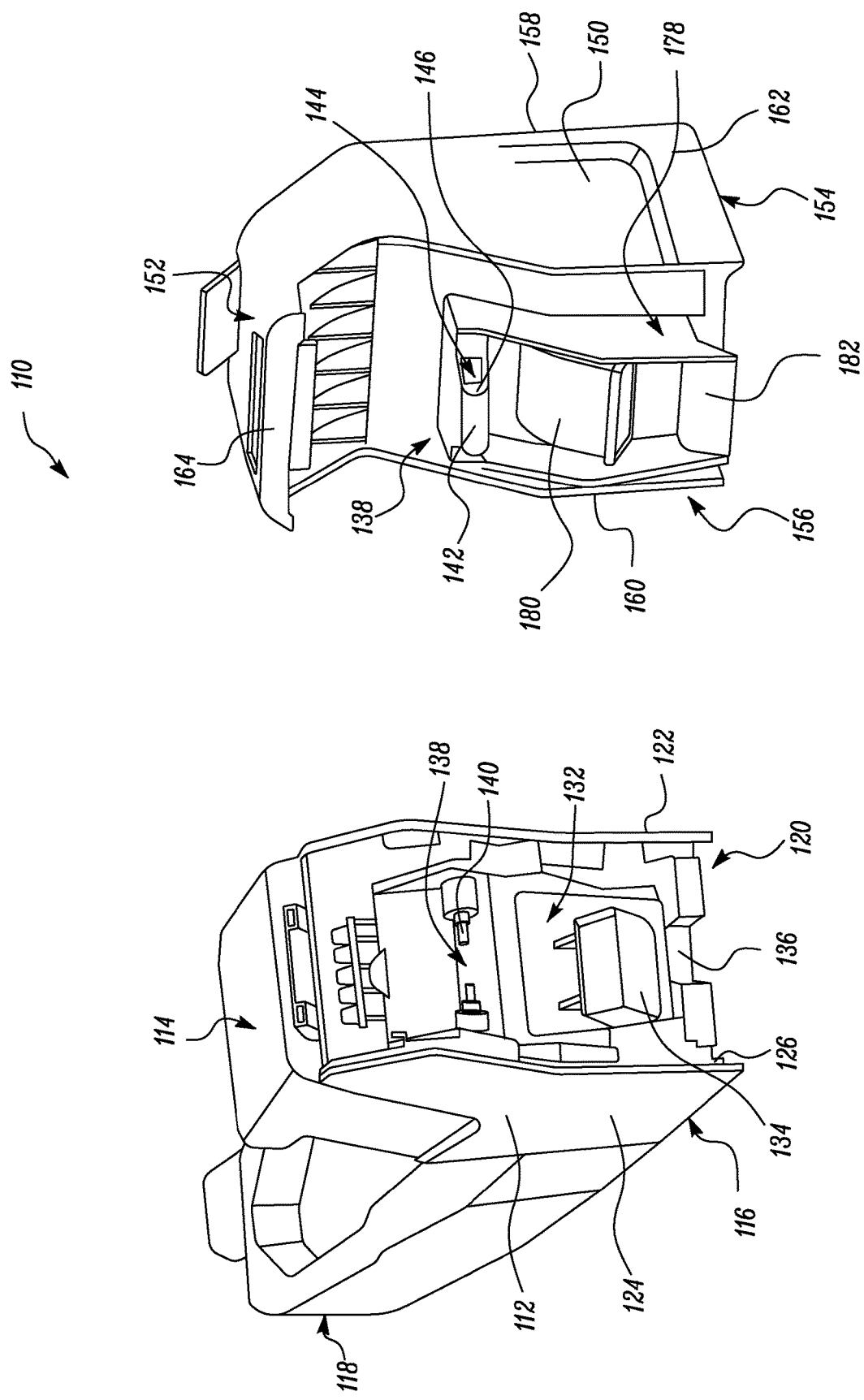
FIG. 17 provides perspective views illustrating a locking/unlocking assembly configured to lock and selectively unlock a portable body of the multifunctional center console, such as at least the portable body illustrated in FIGS. 1 and 2, to and from the main body of the multifunctional center console.

As shown in the non-limiting example illustrated in FIGS. 1, 2 and 17, the portable body 150 of the multifunctional center console 110 may include functional features such as a carrying handle 164 to carry the portable body 150 when removed from the main body 112 of the multifunctional center console 110, HVAC vents 166, a wireless charging pad 168 (e.g. inductive charging pad), a USB port 170, a storage drawer 172 (e.g. slidable and/or push-push operated), a side-mounted storage pocket 174 for storing various articles, such as a beverage bottle, and a hidden safe/storage compartment 176 (e.g. which may be lockable/unlockable).

In some examples, the at least one functional feature may include the wireless charging pad 168. The wireless charging pad 168 may be a part of the main body 112 or any one of the portable bodies 150, 250, 350, 450, 550. The wireless charging pad 168 may allow mobile phone device(s) (not shown) to be charged by placing the devices on the wireless charging pad 168. In some examples, the wireless charging pad 168 may receive electrical power from the vehicle. In other examples, any of the portable bodies 150, 250, 350, 450, 550 may include an internal rechargeable power source as described in detail later. In other examples, any of the portable bodies 150, 250, 350, 450, 550 may be electrically connected to an external power source.

Figure 6A:
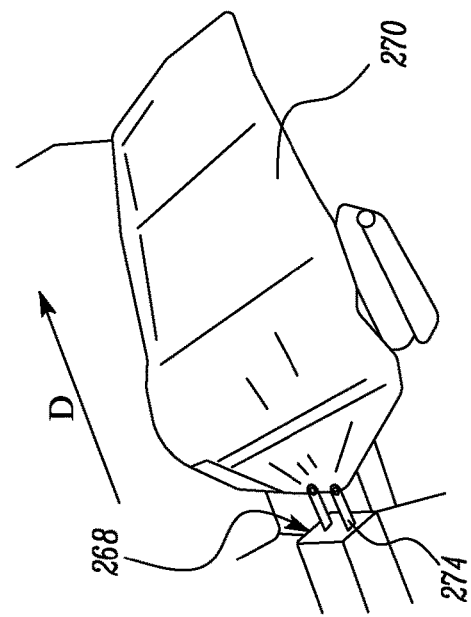
FIGS. 6A, 6B and 6C provide perspective views of seating and/or cargo areas within a vehicle interior, illustrating various configurations in which the seating and/or cargo areas are covered by the protective liner removed from the first storage compartment of the portable body shown in FIGS. 3-5.
Figure 6B:
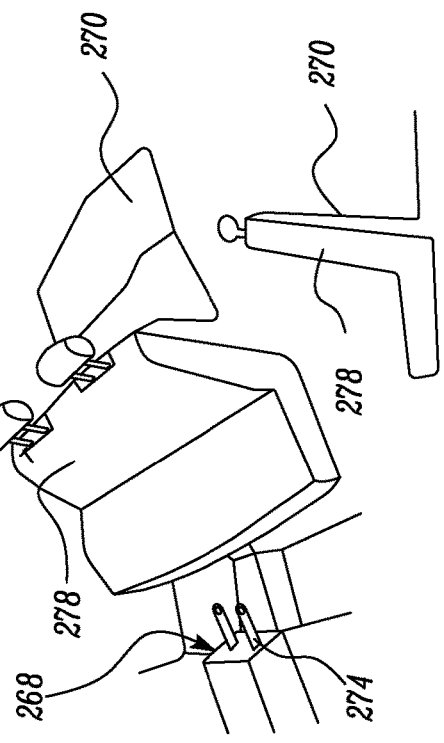
Figure 6C:
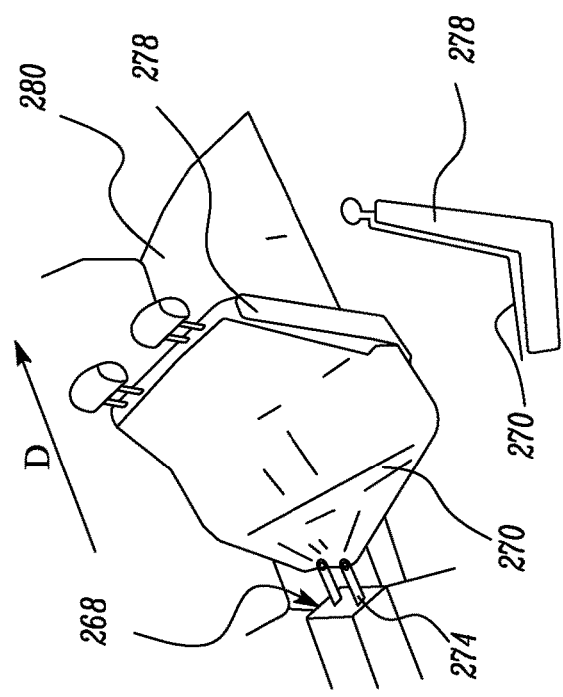
Figure 7:
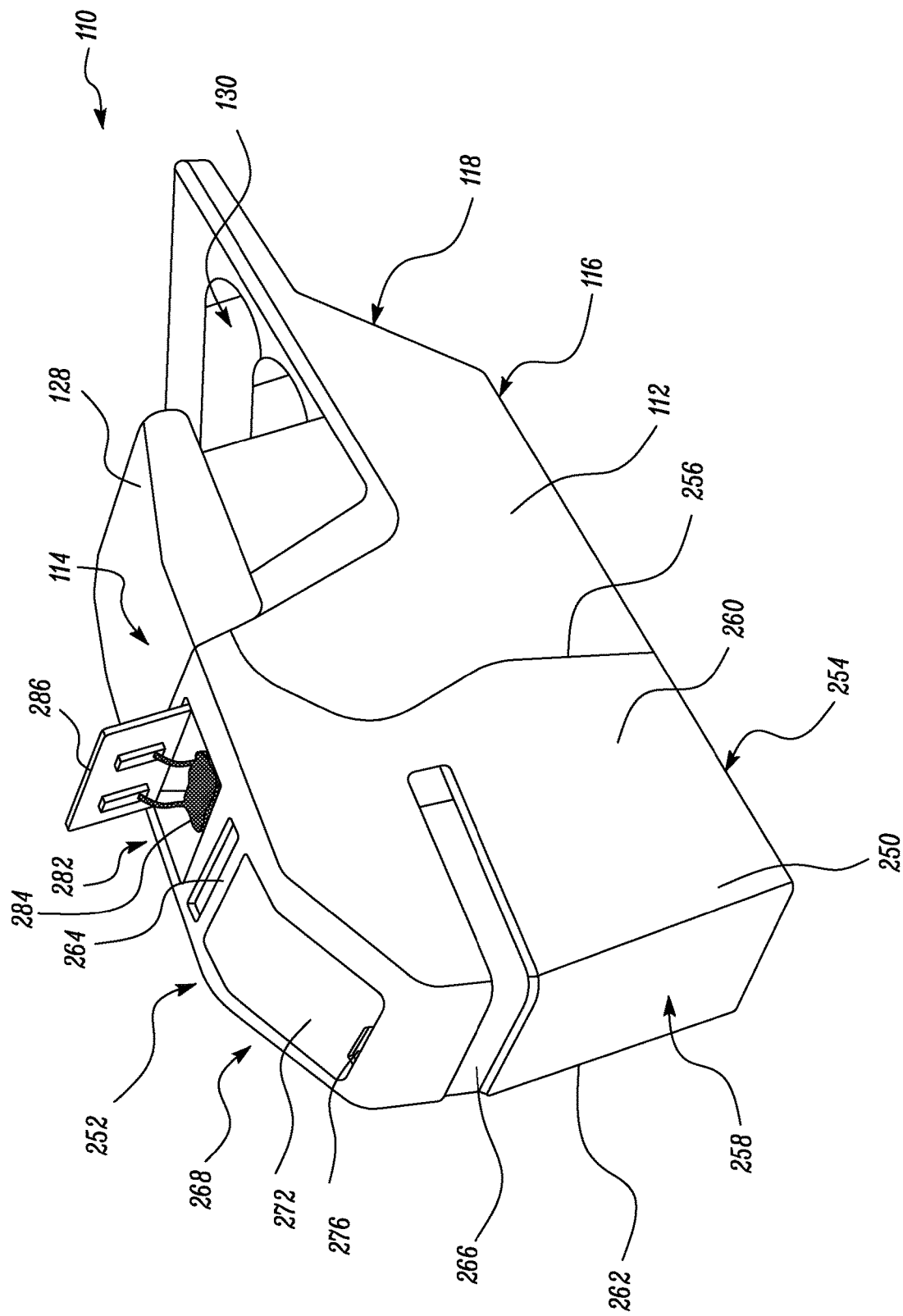
FIG. 7 is a rear perspective view of the multifunctional center console, further illustrating the portable body shown in FIGS. 3-5 with a second access cover displaced into an open position so as to access netting stored within a second storage compartment of the portable body.
Figure 9A:
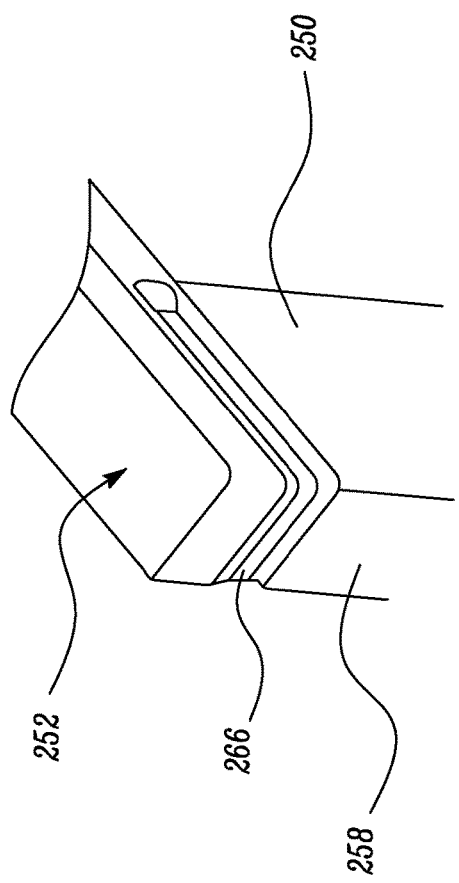
FIGS. 9A and 9B provide rear perspective schematic views of the multifunctional center console, further illustrating different positions of an adjustable cargo-retaining strap of the portable body shown in FIGS. 3-5 and 7.
Figure 9B:
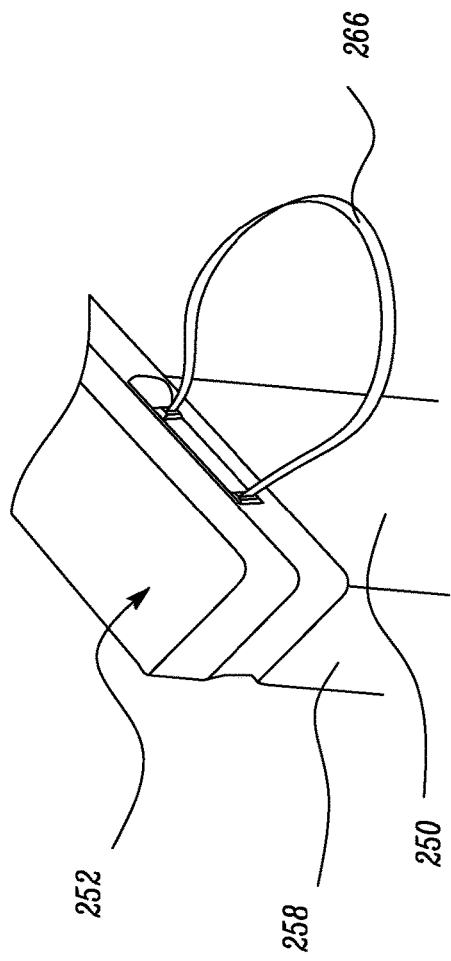

As shown in the non-limiting example illustrated in FIGS. 3, 4, 5, 6A-6C, 7, 8A-8C, 9A and 9B, the portable body 250 of the multifunctional center console 110 may include functional features such as a carrying handle 264 to carry the portable body 250 when removed from the main body 112 of the multifunctional center console 110 and an adjustable (e.g. slidable/lockable) cargo-retaining strap 266 for holding/retaining various articles, which is schematically shown in first and second adjusted configurations in FIGS. 9A and 9B. Additionally, the portable body 250 of the multifunctional center console 110 may further include functional features such as a first storage compartment 268 including at least one protective liner 270 installed therein. The protective liner 270 installed in the first storage compartment 268 may be accessed by opening a first access cover 272. As shown in FIGS. 4, 5 and 6A-6C, the protective liner 270 may be selectively removed from the first storage compartment 268 and may be removably anchored or secured to the first storage compartment 268 by a strap 274 which may extend though a slot 276 defined in one edge of the first access cover 272. Once removed from the first storage compartment 268, the protective liner 270 may be arranged so as to cover and protect at least one interior component 278 (e.g. vehicle seating) and/or at least one cargo area 280 (e.g. vehicle flooring) within the interior of the vehicle, as shown in FIGS. 6A-6C. As such, the various interior components and/or cargo areas within the vehicle may be protected from damage, dirt, stains, moisture, etc. when the interior of the vehicle is utilized during such activities as camping or during transporting various cargo, children, pets, etc. Additionally, the portable body 250 of the multifunctional center console 110 may further include functional features such as a second storage compartment 282 including netting 284 installed therein. The netting 284 installed in the second storage compartment 282 may be accessed by opening a second access cover 286. As shown in FIGS. 7 and 8A-8C, the netting 284 may be anchored at one end to an inner portion of the second access cover 286 and may be selectively removed from the second storage compartment 282 so as to be removably attached to at least one interior component 288 (e.g. a headrest or clip on vehicle seating or other vehicle component). As such, as shown in FIGS. 8A-8C, various cargo, children, pets, etc. may be substantially blocked or guarded from protruding into a front cockpit area of the interior of the vehicle if desired.

Figure 10:
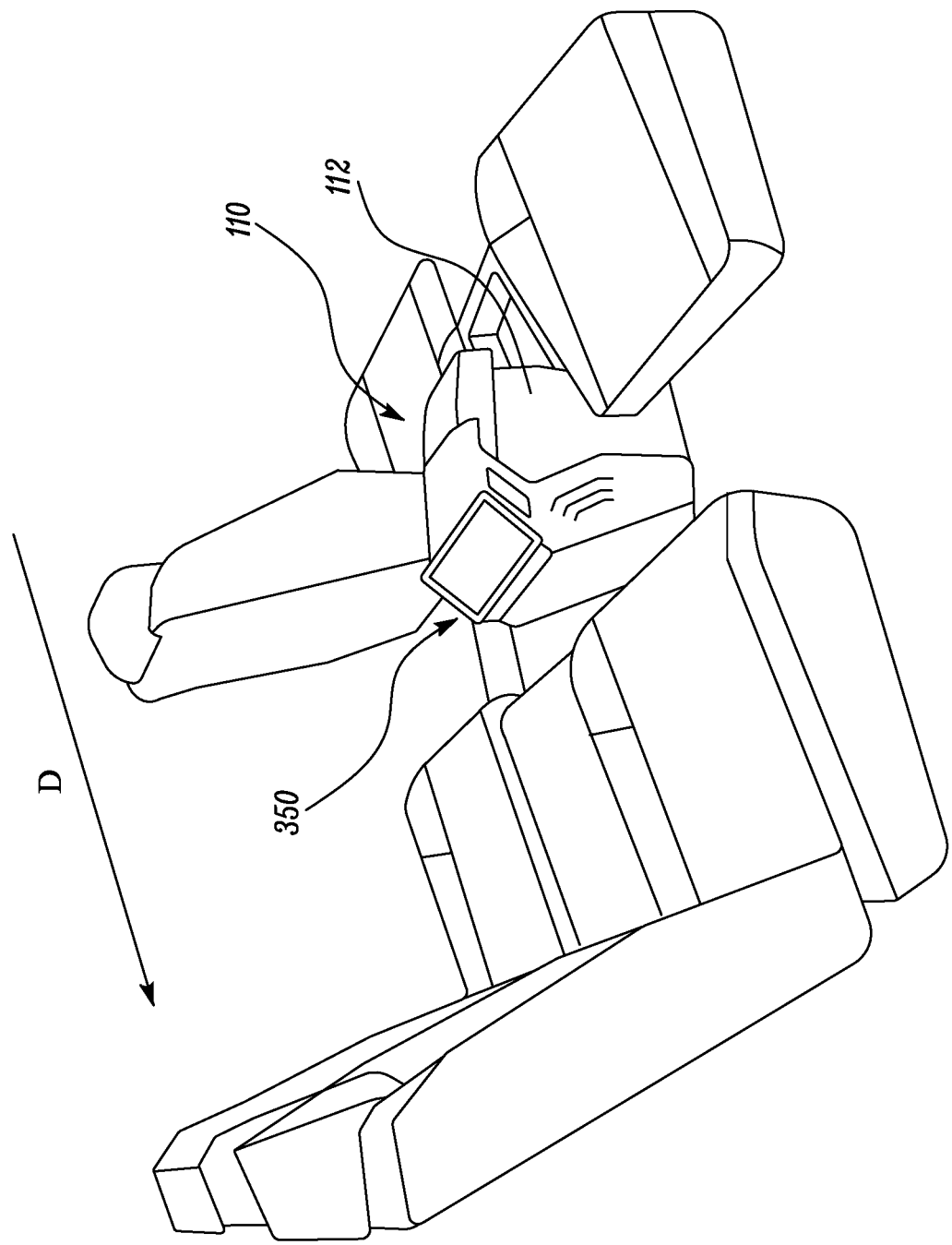
FIG. 10 is a rear perspective view of the multifunctional center console arranged within a vehicle interior, illustrating yet another exemplary portable body of the multifunctional center console removably attached to the main body of the multifunctional center console.
Figure 11:
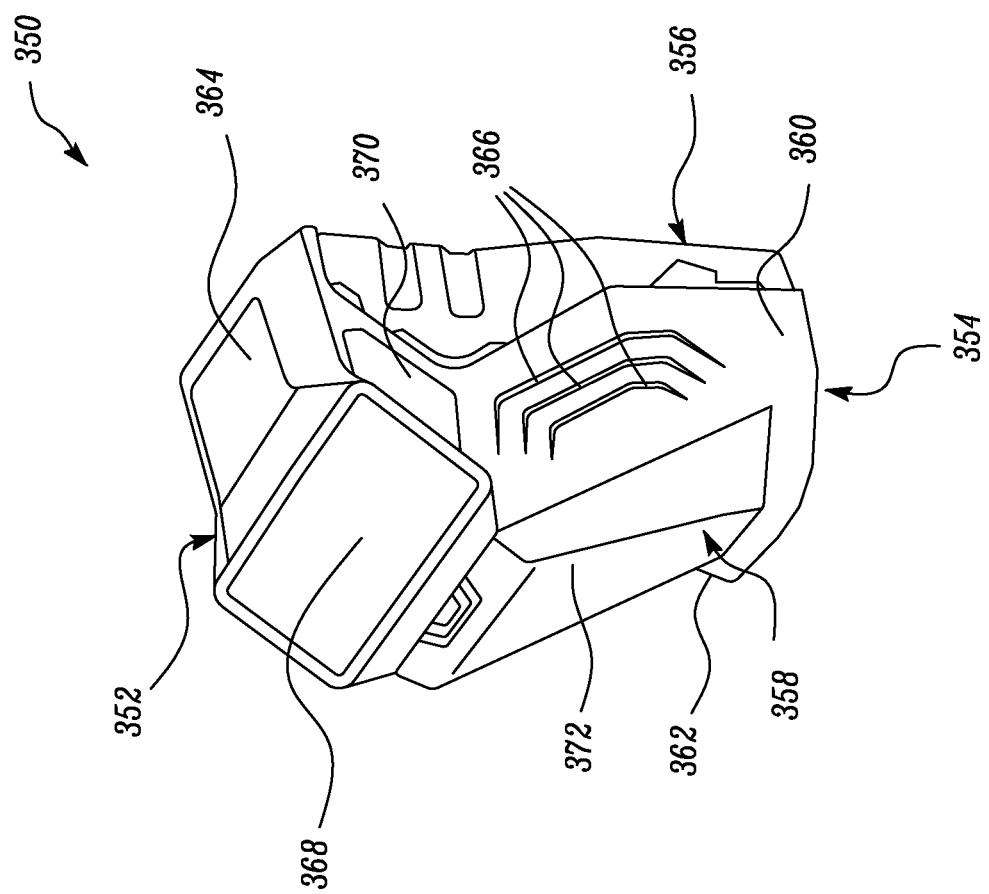
FIG. 11 is a rear perspective view of the portable body shown in FIG. 10, further illustrating the portable body removed and separated from the main body of the multifunctional center console.
Figure 12:
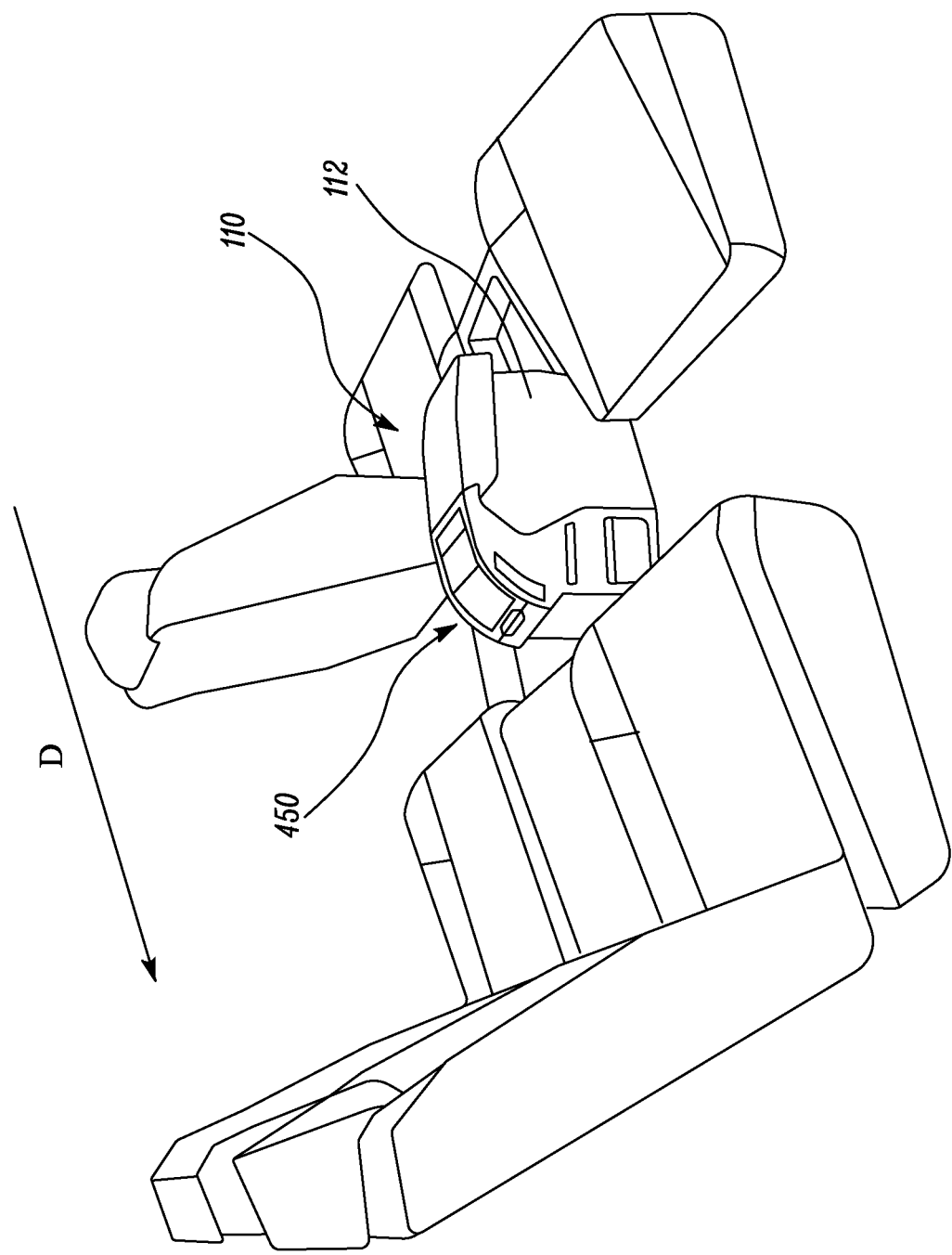
FIG. 12 is a rear perspective view of the multifunctional center console arranged within a vehicle interior, illustrating yet another exemplary portable body of the multifunctional center console removably attached to the main body of the multifunctional center console.
Figure 13:
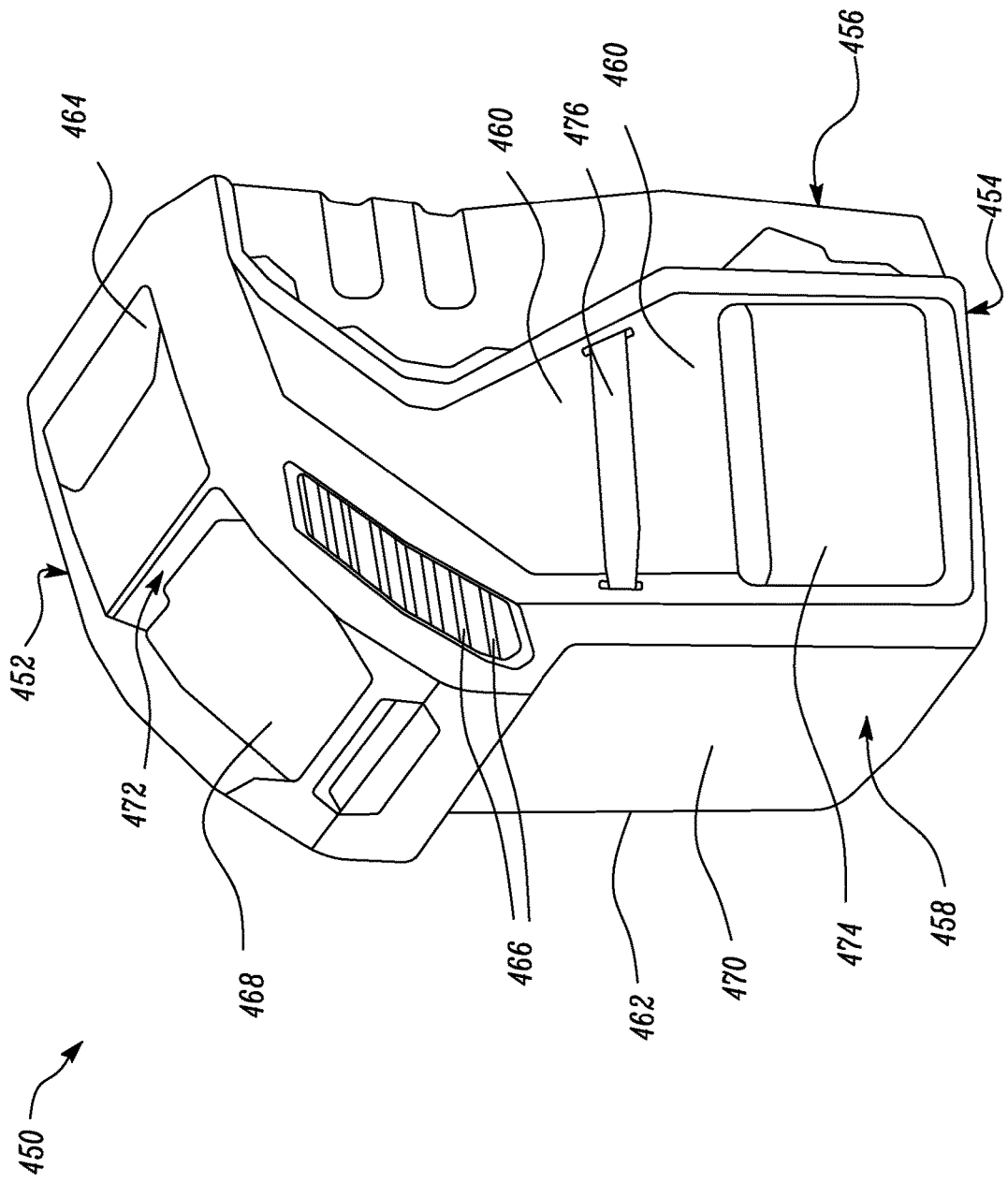
FIG. 13 is a rear perspective view of the portable body shown in FIG. 12, further illustrating the portable body removed and separated from the main body of the multifunctional center console.
Figure 14:
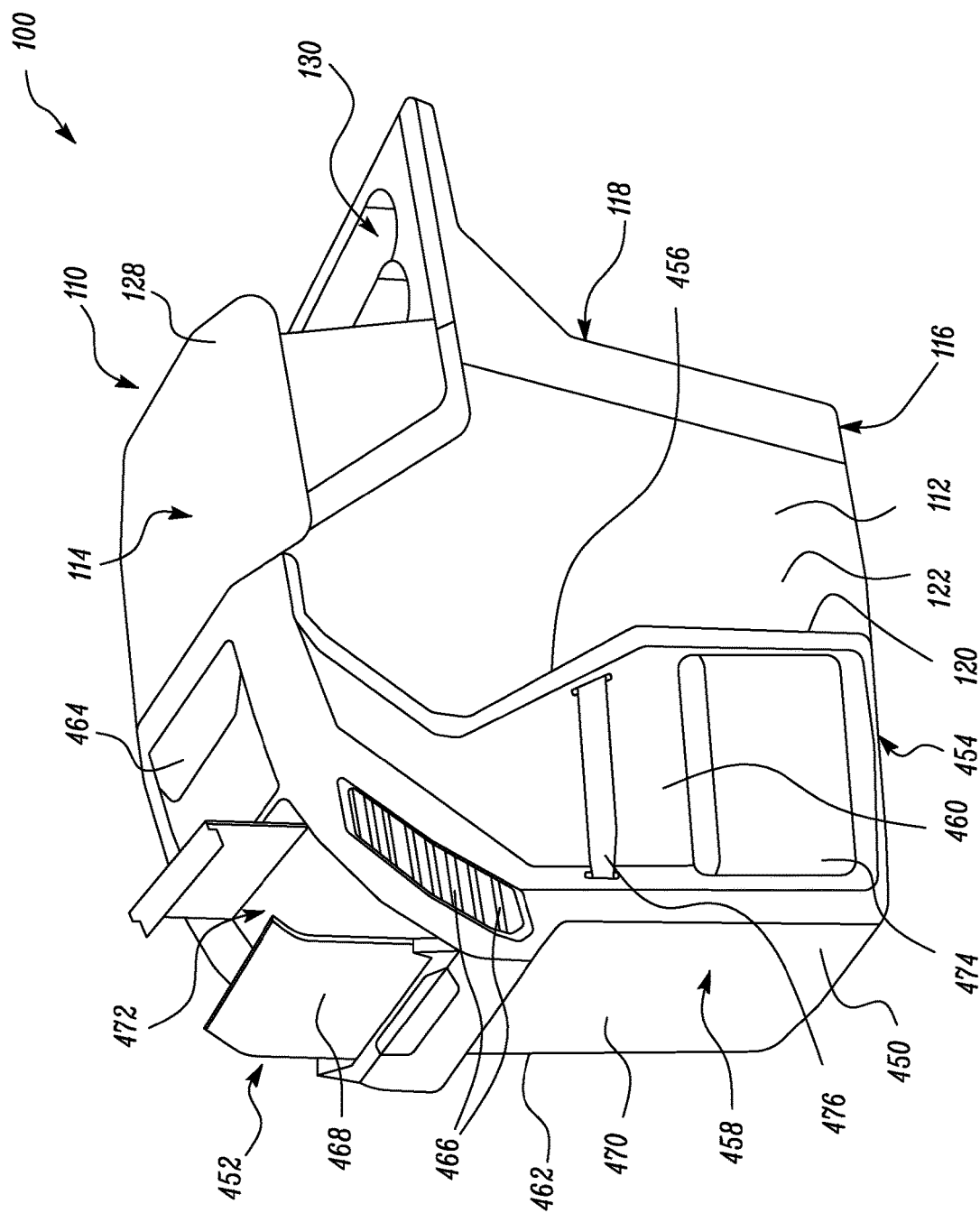
FIG. 14 is a rear perspective view of the multifunctional center console, further illustrating the portable body shown in FIG. 12 with a storage compartment being accessed so as to store various articles within the storage compartment of the portable body.

As shown in the non-limiting example illustrated in FIGS. 10 and 11, the portable body 350 of the multifunctional center console 110 may include functional features such as a wireless charging pad 364 (e.g. inductive charging pad), HVAC vents 366, a multimedia interface 368 (e.g. a video display), audio speakers 370 and an openable/closable storage compartment 372.

As shown in the non-limiting example illustrated in FIGS. 12-15, the portable body 450 of the multifunctional center console 110 may include functional features such as a carrying handle 464 to carry the portable body 450 when removed from the main body 112 of the multifunctional center console 110, HVAC vents 466, a wireless charging pad 468 (e.g. inductive charging pad), an openable/closable storage compartment 470, a hidden storage compartment/safe 472, a side-mounted storage pocket 474 for storing various articles and an elastic cargo-retaining band 476 for holding/retaining various articles.

Figure 15:
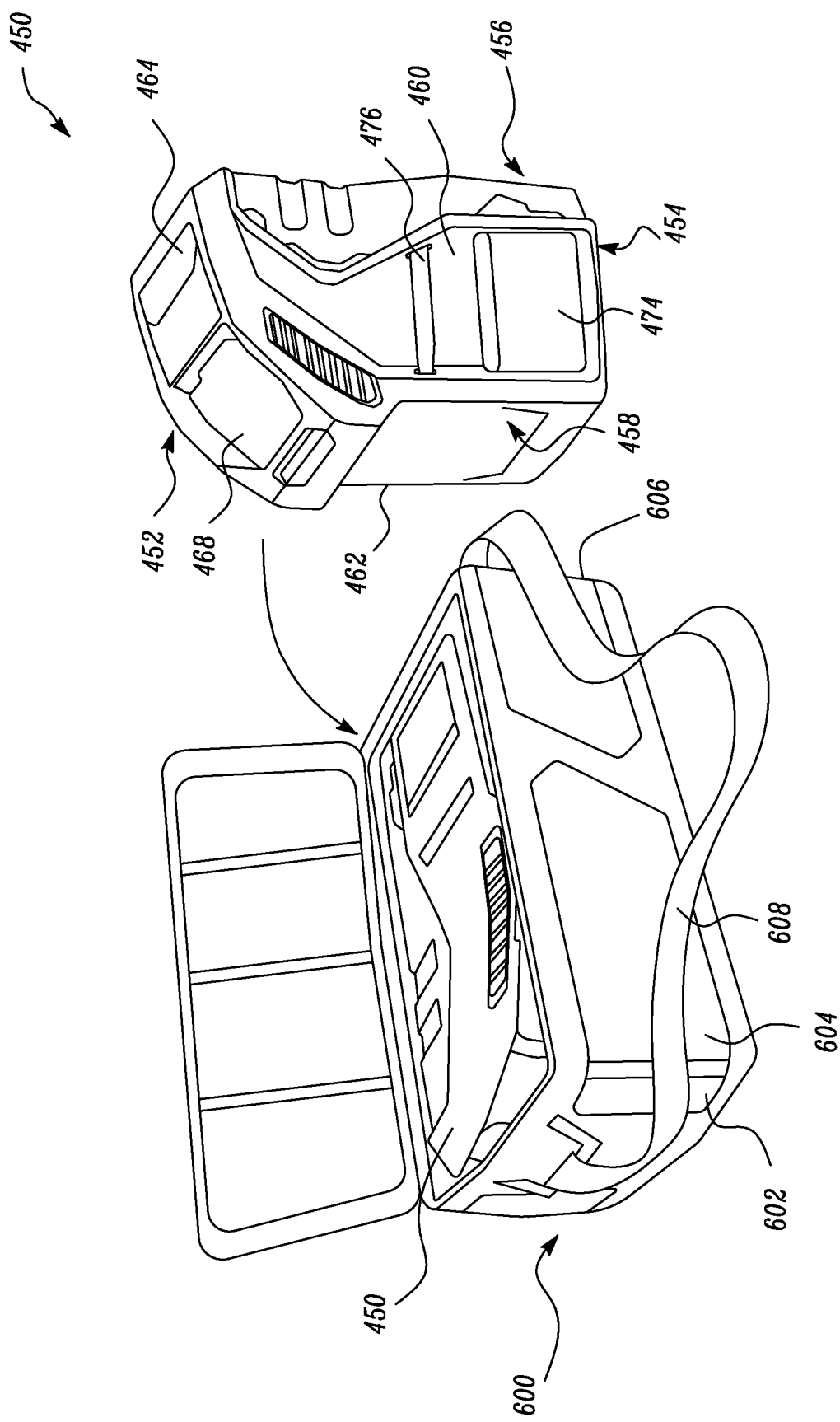
FIG. 15 is a perspective view of an exemplary portable storage case of the multifunctional center console system, further illustrating the portable body shown in FIG. 13 being placed into the portable storage case so as to be held, stored and/or transported in the portable storage case.
Figure 16:
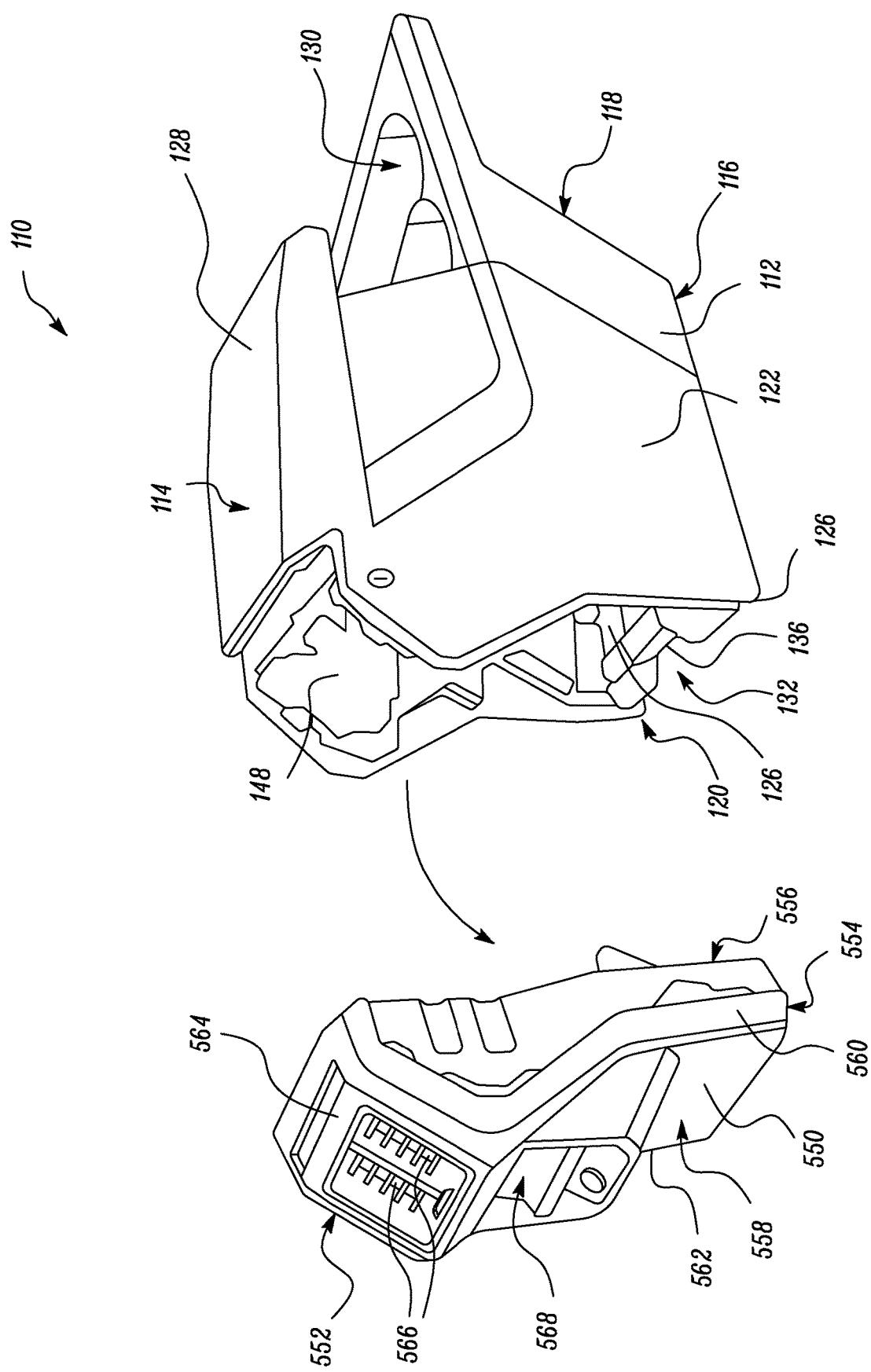
FIG. 16 is a rear perspective view of the multifunctional center console, illustrating yet another exemplary portable body of the multifunctional center console being removed and separated from the main body of the multifunctional center console after being unlocked from the main body.
Figure 18:
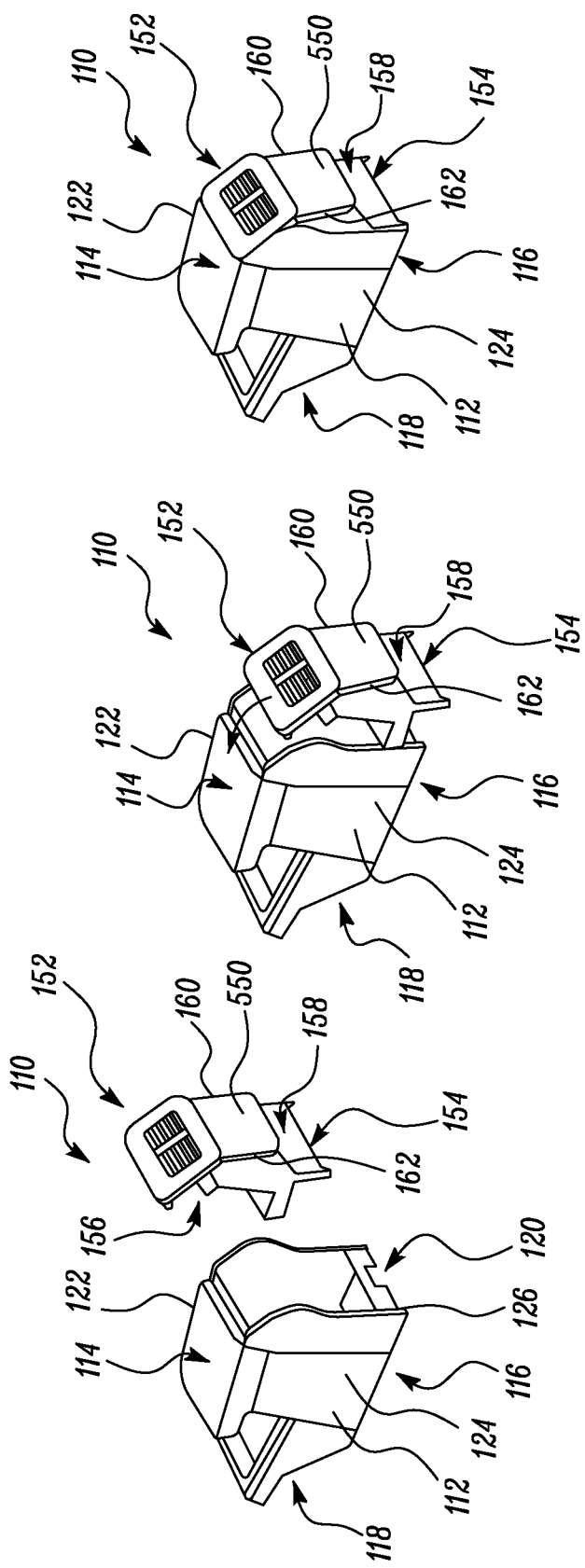
FIG. 18 provides rear perspective views of the multifunctional center console, illustrating the portable body shown in FIG. 16 being positioned and rotated in a generally upward and forward direction of a vehicle so as to be removably attached and locked to the main body of the multifunctional center console.

As shown in the non-limiting example illustrated in FIGS. 16 and 18, the portable body 550 of the multifunctional center console 110 may include functional features such as a carrying handle 564 to carry the portable body 550 when removed from the main body 112 of the multifunctional center console 110, HVAC vents 566 and at least one storage compartment 568. While non-limiting examples of various portable bodies 150, 250, 350, 450, 550 of the multifunctional center console 110 are shown throughout FIGS. 1-18 and described herein, it is to be understood that the multifunctional center console 110 may include any number of possible interchangeable portable bodies capable of being removably attached to the main body 112 of the multifunctional center console 110, one at a given time, and the any number of possible interchangeable portable bodies may include any number of possible functional features or combinations of functional features, such as, but not limited to, at least one or more of a carrying handle, a cup holder, a side-mounted storage pocket, a cargo-retaining strap, an elastic cargo-retaining band, a storage compartment, a lockable/unlockable safe, a storage drawer, an openable/closable access cover, ambient lighting, LED lighting, a vehicle HVAC component, a vehicle HVAC vent, a climate control feature, a heated seat control feature, a vehicle electrical component, a vehicle audio/video component, a speaker, a display screen, a vehicle infotainment system control feature, a portable electronic device holder, a USB port, an electrical receptacle, a wireless charging pad (e.g. inductive charging pad), and a wireless power transmission system antenna array (e.g. as disclosed in U.S. Patent Application Publication No. 2017/0179766 A1, by Ossia, Inc. or U.S. Patent Application Publication No. 2018/0262050A1, by Yank Technologies, Inc.).

In some examples, the at least one functional feature may include a docking system including a portion for docking (not shown) a mobile device, such as a smartphone, a personal digital assistant (PDA), a video game console, one or more entertainment systems, and the like. The docking system may be a part of the main body 112 or any one of the portable bodies 150, 250, 350, 450, 550. The docking system may include additional functionality to allow hands free communication with the mobile device. For instance, the docking system may include a built-in speaker and a microphone to allow such functionality. The docking system may also include additional functionality so as to allow the mobile device to be connected to a mobile network for cellular data communication. Additionally, the docking system may also allow charging of the mobile device when the mobile device is plugged into the docking system.

In some examples, the at least one functional feature may include a storage portion for holding articles, such as spectacles, coins, and the like. The storage portion may be a part of the main body 112 or any one of the portable bodies 150, 250, 350, 450, 550. In another example, the at least one functional feature may include any means for dispensing tissues, facial wipes, etc. The means for dispensing may be a part of the main body 112 or any one of the portable bodies 150, 250, 350, 450, 550. In yet another example, the at least one functional feature may include a storage compartment (not shown) for holding articles, such as a vacuum device or cleaner for cleaning an interior portion of the vehicle. The vacuum device may be a part of the main body 112 or any one of the portable bodies 150, 250, 350, 450, 550. In another example, the at least one functional feature may include an integrated vacuum device. The integrated vacuum device may be integrated with the main body 112 or any one of the portable bodies 150, 250, 350, 450, 550. In other examples, the at least one functional feature may include an integrated safe (not shown) for storing valuable items. For instance, the integrated safe may be used to store wallet, cash, etc. The integrated safe may be a part of the main body 112 or any one of the portable bodies 150, 250, 350, 450, 550.

Figure 19B:
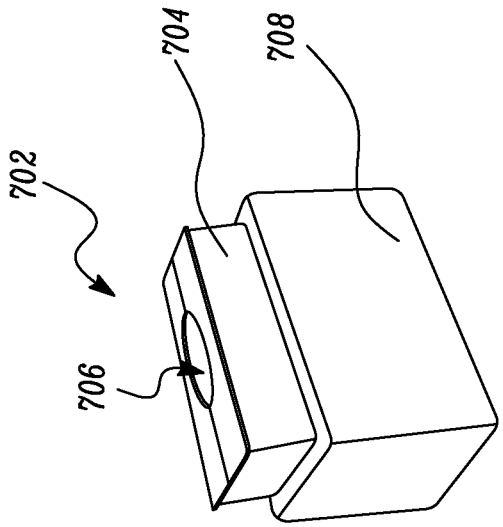
FIGS. 19A-19D provide perspective views of an exemplary utility tray and glove box as a functional feature of the multifunctional center console system illustrating the utility tray being transitioned from a home position to a deployed position through a stowed position.
Figure 19D:
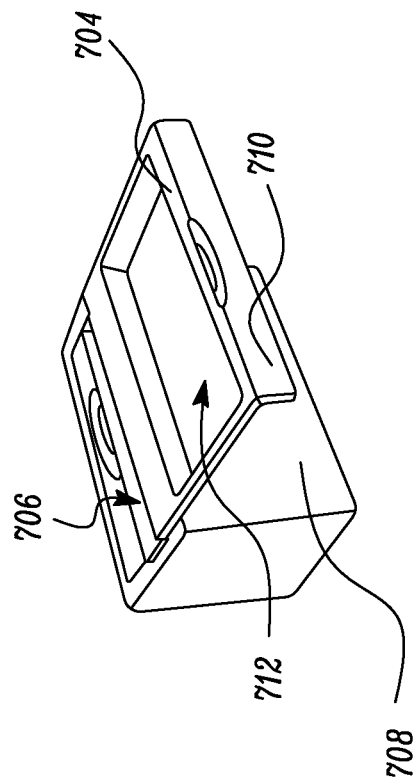
Figure 19A:
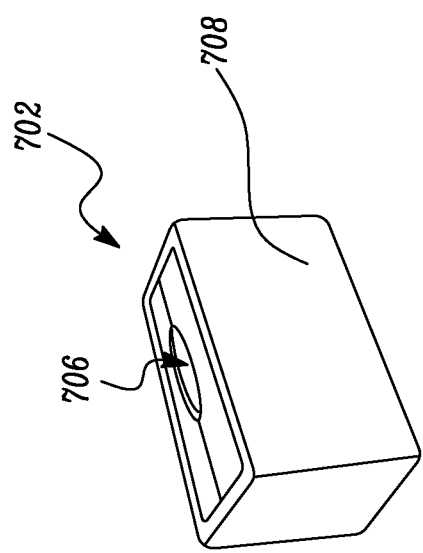
Figure 19C:
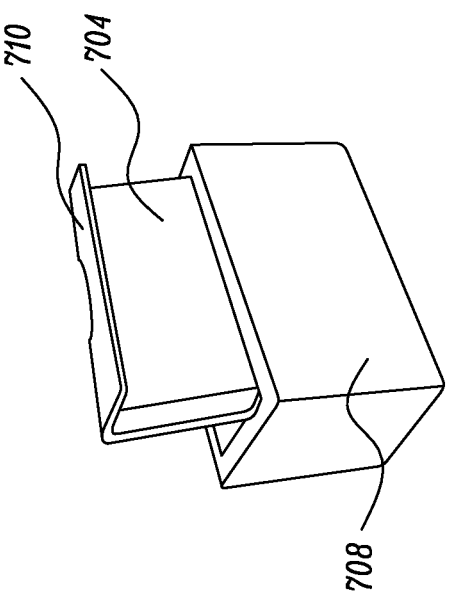

As shown in the non-limiting example illustrated in FIGS. 19A-19D, the at least one functional feature may include a utility tray and glove box 702. The utility tray and glove box 702 may be a part of the main body 112 or any one of the portable bodies 150, 250, 350, 450, 550. The utility tray and glove box 702 includes a tray portion 704 and a glove box portion 706. The utility tray and glove box 702 may engage a portion of a body 708. The body 708 may be a part of the main body 112 or any one of the portable bodies 150, 250, 350, 450, 550. As shown in FIG. 19A, the tray portion 704 of the utility tray and glove box 702 is received in a recess in the body 708 in a home position. As shown in FIG. 19B, the tray portion 704 of the utility tray and glove box 702 may extend outwardly from the body 708 when in a stowed position. The tray portion 704 may be pivotally connected to the body 708 so as to permit the tray portion 704 to be rotated from the stowed position shown in FIG. 19C to a deployed position shown in FIG. 19D. An end portion 710 (shown in FIG. 19D) of the utility tray and glove box 702 may operate as a handle for allowing the tray portion 704 to be moved between the home position, the stowed position and the deployed position.

In some examples, the tray portion 704 of the utility tray and glove box 702 may include a recess 712 formed therein for holding articles. In another example, the tray portion 704 may include multiple recesses. In yet another example, the tray portion 704 may include multiple recesses with different dimensions thereby allowing articles with differing sizes to be stored. As such, the tray portion 704 is a multipurpose tray that provides a flat surface and/or recesses for different purposes. For instance, the tray portion 704 may be used to complete paperwork or for placing food items for temporary storage and the like.

The utility tray and glove box 702 includes the glove box portion 706. As shown in FIGS. 19A-19D, the glove box portion 706 may be accessed by moving the tray portion 704 from the home position to the deployed position. The glove box portion 706 may be used for storing appropriate articles when the tray portion 704 is moved in the manner described above. In some examples, the tray portion 704 and the glove box portion 706 may be provided separately as part of the one or more functional features of the multifunctional center console system.

Similarly, the functional feature may include a utility table for placing larger articles. For instance, the utility table may be used to place laptops, tablets and the like. As such, the utility table is multifunctional and may be used to hold various articles with minimal storage space requirements. It should be understood that any other type of deploying mechanism may be used for the utility table. For instance, the utility table may be flipped out from a home position to obtain a deployable position.

In some examples, the at least one functional feature may include a trash container (not shown) for storing refuse articles. For instance, the trash container may be used to store used cups, beverage cans, gums, and the like.

Figure 20:
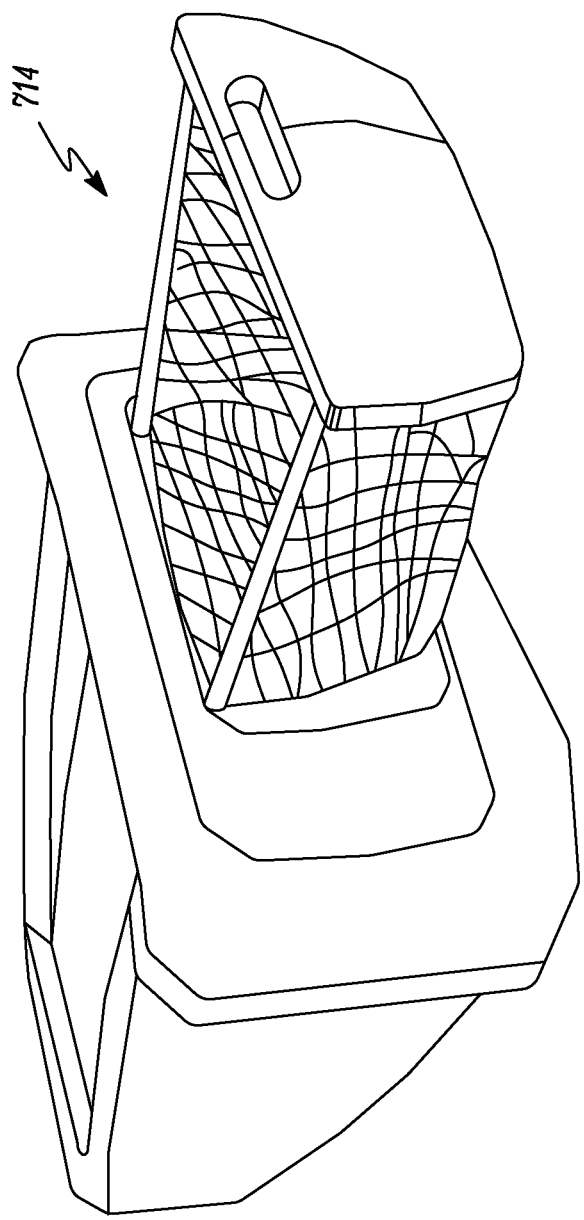
FIG. 20 is a perspective view of an exemplary net storage compartment as a functional feature of the multifunctional center console system.

As shown in the non-limiting example illustrated in FIG. 20, the at least one functional feature may include a net storage compartment 714. The net storage compartment 714 may serve as a flexible storage compartment for holding and organizing appropriate articles within the interior of the vehicle. For instance, the net storage compartment 714 may be used to store eggs, fruits, and the like. In some examples, the net storage compartment 714 may be stowed, i.e., would not take up space when the net storage compartment 714 is not in use.

In some examples, the at least one functional feature may include a coffee maker (not shown) for the vehicle. The coffee maker may be a part of the main body 112 or any one of the portable bodies 150, 250, 350, 450, 550. The coffee maker may include a coffee mug, a brewing station and an arrangement for supplying water. The coffee maker further includes means for heating the water and a portion for holding coffee. In some examples, the coffee maker may receive power from a power source of the vehicle. The coffee maker may supply coffee to the coffee mug by passing hot water through the portion for holding coffee.

Figure 21:
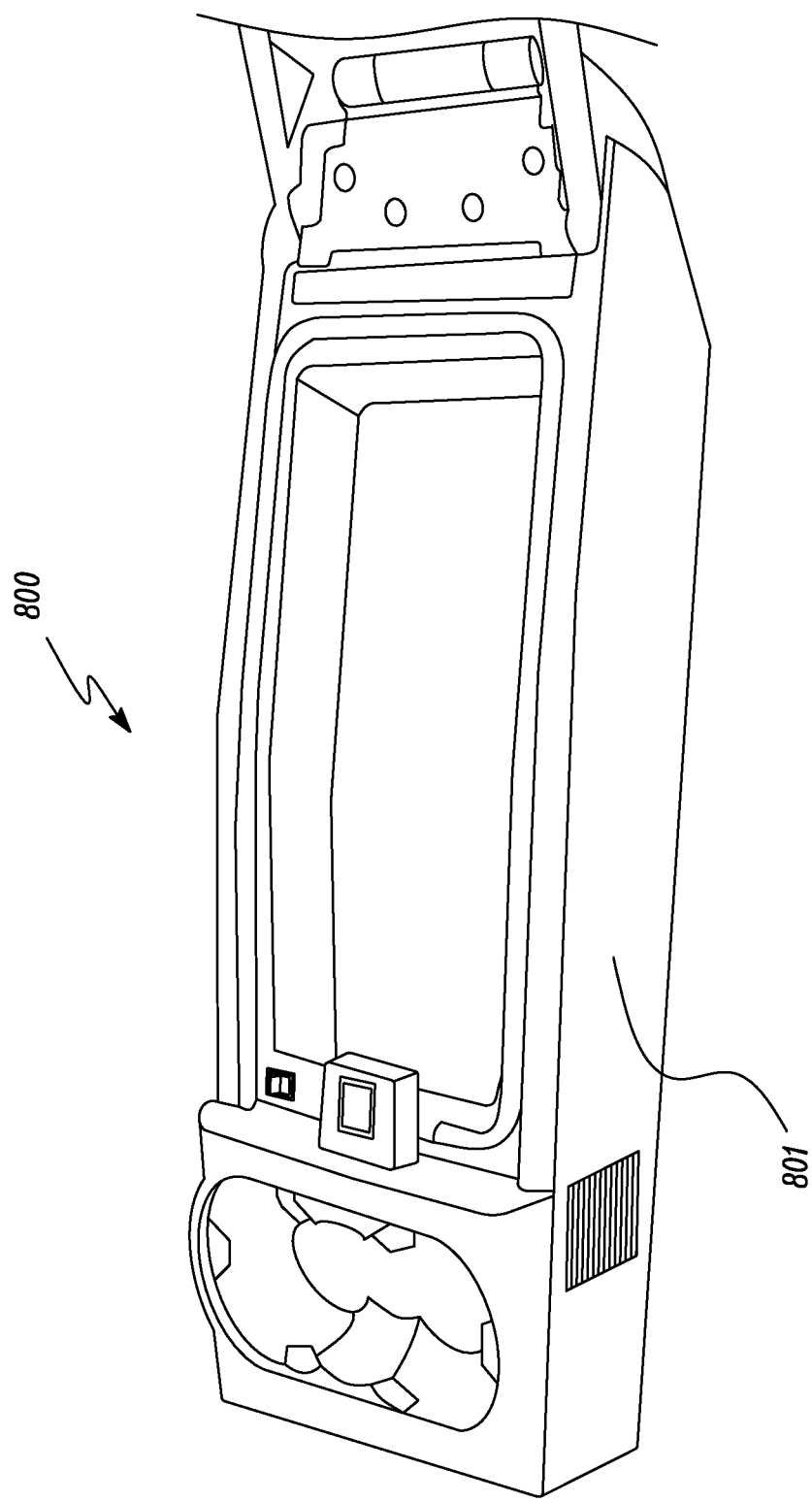
FIG. 21 is a perspective view of an exemplary cooled console as a functional feature of the multifunctional center console system.

As shown in the non-limiting example illustrated in FIG. 21, the at least one functional feature may include a cooled console 800 integrated with a body 801. The cooled console 800 may be a part of the main body 112 or any one of the portable bodies 150, 250, 350, 450, 550. In some examples, the body 801 may be part of the main body 112. In some other examples, the body 801 may be part of any one of the portable bodies 150, 250, 350, 450, 550. The cooled console 800 may be used to store food items, beverages, and the like for refrigeration. Although, in the illustrated example, the cooled console 800 includes a single compartment, however, the cooled console 800 may include multiple compartments based on application requirements. In some examples, the cooled console 800 may operate in one or more of several modes, including refrigeration, beverage chilling, and freezing. In some examples, a user may select a desired temperature for the cooled console 800 using a control panel (not shown). Therefore, the quality of food stored within the cooled console 800 may be maintained according to the user-selected operational mode. In an example, the cooled console 800 may have a defined interior volume, and may be capable of storing multiple cans of beverage (not shown). In another example, the cooled console 800 is capable of storing items below 15° C. (59° F.) for a period of three hours under ambient conditions of up to 40° C. (104° F.).

Figure 22:
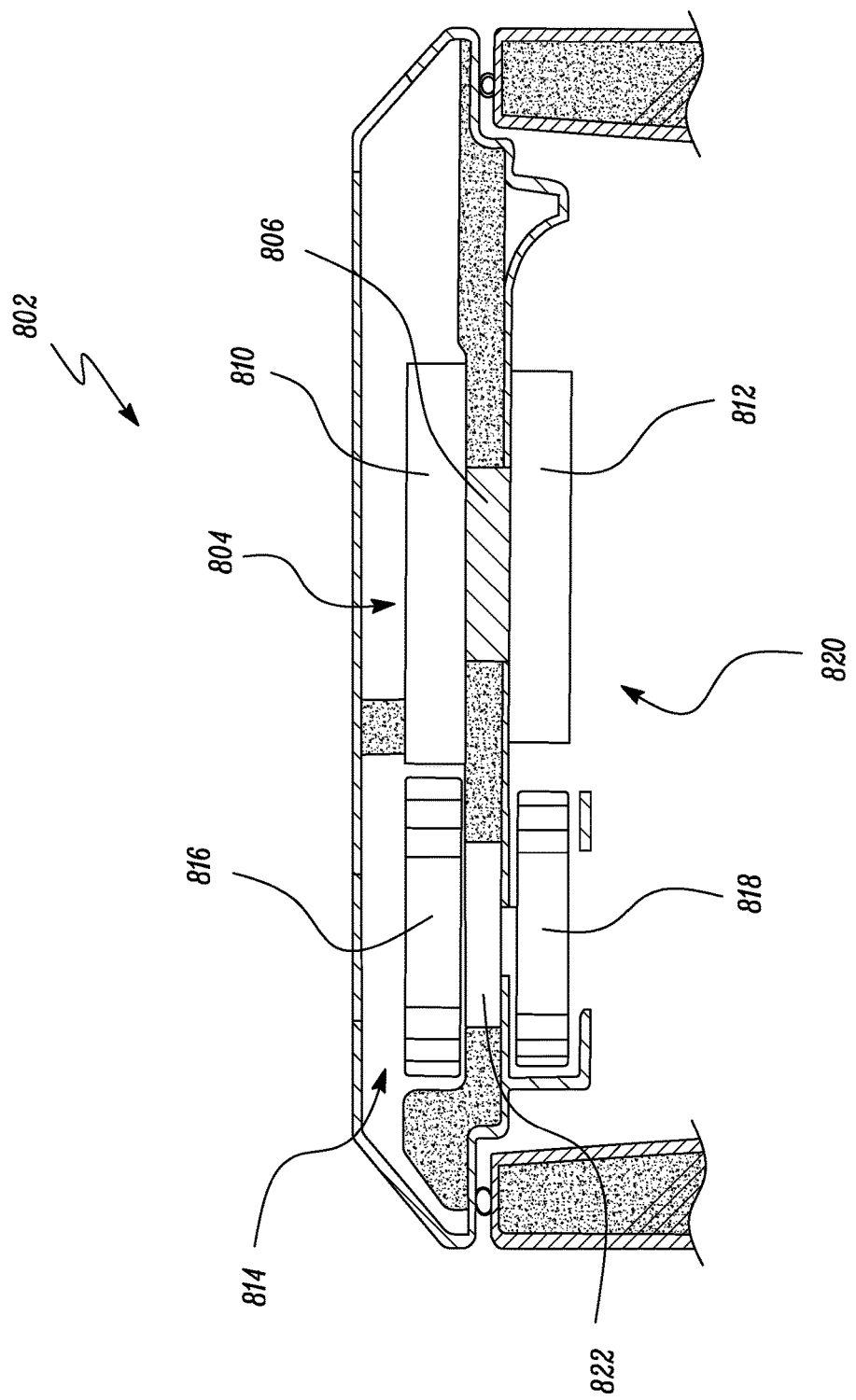
FIG. 22 is a schematic view of an exemplary cooling system for a cooled console as a functional feature of the multifunctional center console system.
Figure 23:
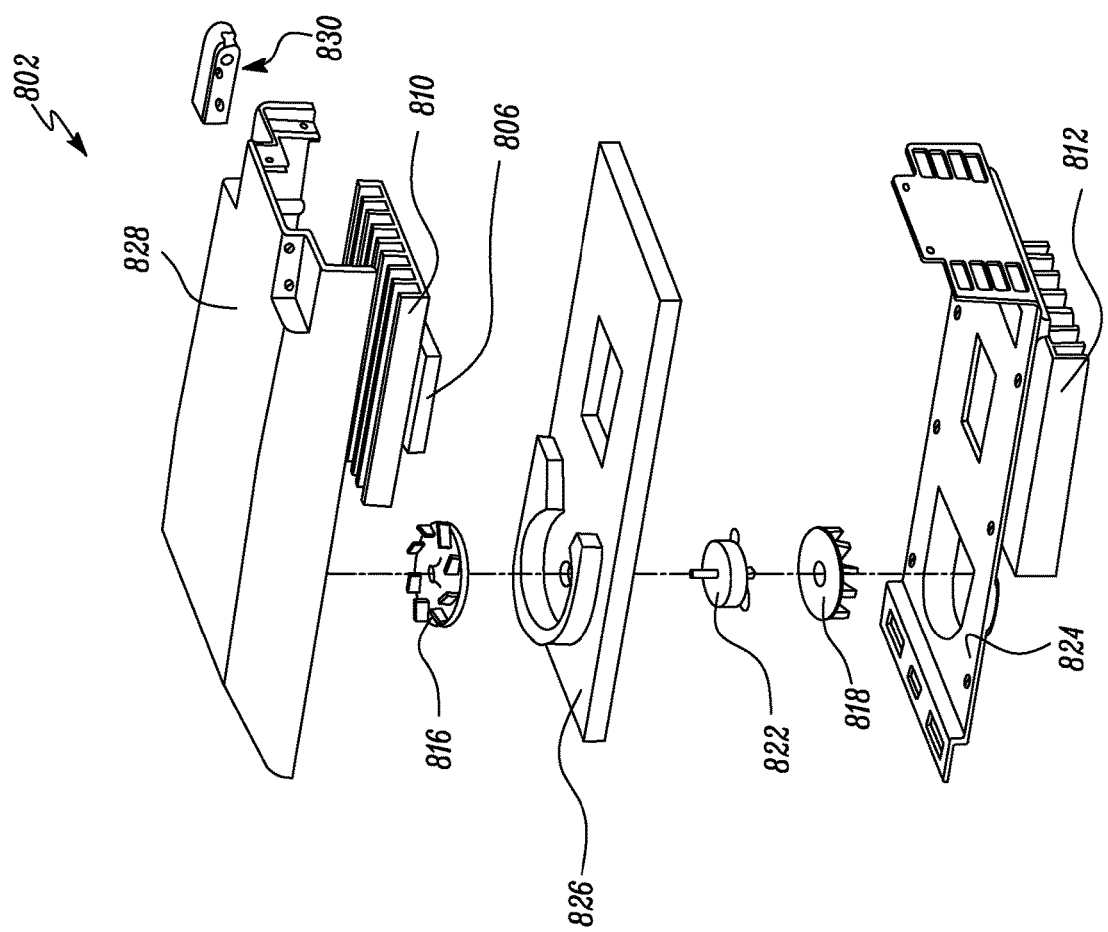
FIG. 23 is an exploded view of the exemplary cooling system of FIG. 22.

In some examples, the cooled console 800 may be operatively coupled to a cooling system 802 as shown in the non-limiting example illustrated in FIGS. 22 and 23. In the illustrated example, the cooling system 802 is based on thermoelectric cooling. Further, the cooling system 802 utilizes a solid-state electronic heat pump 804. The heat pump 804 includes a Peltier unit 806 arranged between a pair of heat exchangers. The pair of heat exchangers includes a hot side heat sink 810 and a cold side heat sink 812. The cooling system 802 further includes a double sided blower 814 having a hot side blower unit 816 and a cold side blower unit 818. The double sided blower 814 may circulate ambient air over the hot side heat sink 810. Further, the double sided blower 814 may recirculate cooled air over the cold side heat sink 812. The cold side heat sink 812 may be coupled to a storage compartment 820 of the cooled console 800 thereby providing cooling to the storage compartment 820. In some examples, the double sided blower 814 may be driven by an electric motor 822.

Referring again to FIGS. 22 and 23, the cooling system 802 may include an inner panel 824 on which the cooling system 802 components may be mounted. In some examples, an insulation 826 may be provided between the hot side heat sink 810 and the cold side heat sink 812. The inner panel 824 and the insulation 826 may serve to separate the storage compartment 820 from the hot side heat sink 810. The cooling system 802 further includes an outer panel 828 coupled to the main body 112 via a hinge mechanism 830. As such, the hinge mechanism 830 may allow the outer panel 828 to be rotated to access the storage compartment 820. The outer panel 828 may form a part of the movable armrest 128.

In some examples, the at least one functional feature may include one or more storage portions that are reconfigurable (not shown). The storage portions may be a part of the main body 112 or any one of the portable bodies 150, 250, 350, 450, 550. The storage portions may allow modification of storage space and design as per application requirements. For instance, one or more storage compartments of the storage portions may be added or removed to modify the storage space as per application requirements. Each of the storage portions includes multiple storage compartments with different configurations. For instance, the storage compartments may include recesses with different dimensions and shapes. Different types of storage compartments may include trays, cup holders, CD holders, refuse storage, safe for valuable items, and the like. Such storage compartments may allow variable options to store articles as per requirements. The storage compartments maybe added to or removed from the respective storage portion. The storage portions may be provided on the main body 112 or any one of the portable bodies 150, 250, 350, 450, 550. In some examples, each of the storage portions may include modular storage compartments that may be arranged, added, or removed as per requirements. Such an arrangement of storage compartments may allow greater flexibility with respect to available storage space.

In some examples, the storage portions may include flexible storage compartments (not shown) that may be arranged as per requirements. For instance, the storage compartments may be pulled out from the main body 112 or any one of the portable bodies 150, 250, 350, 450, 550. In other instances, the storage compartments may be displaced to access other storage compartments.

In some examples, each of the storage portions may include side walls that may be removed or adjusted to increase or decrease the storage capacity of the storage portions. For instance, the side walls may slide in or out with respect to the respective storage portion to modify the storage capacity. Alternatively, each of the storage portions may include one or more rails for locating and holding the storage compartments. One or more storage compartments may be added or removed with the help of the rails.

In some examples, each of the storage portions may include storage trays (not shown) that may be reconfigured as per requirements. For instance, one or more tray dividers may be added to or removed from the storage trays to modify the storage space. Tray dividers may be positioned on the storage trays to allow different configurations of the storage trays.

One or more functional features may be removed or added to the main body 112 or any one of the portable bodies 150, 250, 350, 450, 550 as per design and application requirements. It is to be understood that the main body 112 and the portable bodies 150, 250, 350, 450, 550 may include any number of the functional features or combinations thereof as described above.

Furthermore, it is to be understood that at least some functional features of the any number of possible interchangeable portable bodies of the multifunctional center console 110, as previously described herein, may receive electrical power and be fully functional, even when a given one of the interchangeable portable bodies is removed from the main body 112 of the multifunctional center console 110. As non-limiting examples, at least the wireless charging pad 168 and the USB port 170 of the portable body 150 (shown in FIGS. 1, 2 and 17) and the wireless charging pad 364, the multimedia interface 368 and the audio speakers 370 of the portable body 350 (shown in FIGS. 10 and 11) may receive electrical power and be fully functional even when either one of the portable bodies 150, 350 are removed from the main body 112 of the multifunctional center console 110. For instance, in this example, electrical power may be supplied to either of the portable bodies 150, 350 from an external power source (e.g. personal power bank or AC power source) electrically-connected to the portable bodies 150, 350 (e.g. via an electrical receptacle or port and charging cable) to power the aforementioned functional features of the portable bodies 150, 350. Alternatively, or in addition, an internal rechargeable power source (e.g. one or more rechargeable batteries) may be provided at least partially within either of the portable bodies 150, 350 to supply power to the aforementioned functional features of the portable bodies 150, 350. As non-limiting examples, the internal rechargeable power source may receive power to be recharged from an external power source or from electrical power provided by vehicle when one of the portable bodies 150, 350 is removably attached to the main body 112 of the multifunctional center console 110, as will be further described herein. As such, drivers and/or passengers of the vehicle may still be provided at least some functionality from the any number of possible interchangeable portable bodies of the multifunctional center console 110 in various situations (e.g. while at home, camping in the outdoors, at the beach, etc.) even when a given portable body is removed from the main body 112 of the multifunctional center console 110.

Additionally, the multifunctional center console system 100 may further include one or more portable storage cases, such as, but not limited to, the exemplary portable storage case 600 shown in FIG. 15. The portable storage case 600 may be selectively openable/closeable (e.g. via one or more zippers) and may include at least a plurality of soft and/or rigid side portions 602, 604, 606 and a carrying handle or strap 608. The portable storage case 600 may be employed for holding, storing and/or transporting at least one of the any number of possible interchangeable portable bodies of the multifunctional center console 110 (as previously described herein), such as one or more of the portable bodies 150, 250, 350, 450, 550 shown throughout FIGS. 1-18, when removed from the main body 112 of the multifunctional center console 110. In the example shown in FIG. 15, the portable body 450 is shown being placed into the storage case 600 so as to be held, stored and/or transported. As may be understood by one of ordinary skill, one or more of the portable bodies 150, 250, 350, 450, 550 may be placed into one or more storage cases 600 and stored in a storage compartment of the vehicle (e.g. trunk or cargo area) and/or in a storage facility (e.g. a garage).

Referring to at least FIGS. 1, 2 and 17, the overall engagement, removable attachment and locking/unlocking of the any number of possible interchangeable portable bodies of the multifunctional center console 110 described herein, such as, but not limited to, the portable bodies 150, 250, 350, 450, 550 of the multifunctional center console 110, to and from the main body 112 of the multifunctional center console 110 will now be described in greater detail. For purposes of simplicity and clarity, the overall engagement, removable attachment and locking/unlocking of the exemplary portable body 150 (FIGS. 1, 2 and 17) will be described, however, it is to be understood that the forthcoming description of the overall engagement, removable attachment and locking/unlocking may apply to the any number of possible interchangeable portable bodies, including the other exemplary portable bodies 250, 350, 450, 550 described and shown herein.

As shown in FIG. 17, at least a part, such as, but not limited to, a protruding centering portion 178 of the front portion 156 of the portable body 150 of the multifunctional center console 110 may be inserted into a rear opening 132 defined at and extending through at least the rear portion 120 of the main body 112 of the multifunctional center console 110. In other words, the rear opening 132 defined at the rear portion 120 of the main body 112 may be shaped and sized to receive the at least a part (e.g. centering portion 178) of the front portion 156 of the portable body 150 of the multifunctional center console 110 therein. In this example, the centering portion 178 of the front portion 156 of the portable body 150 aids to align and center the portable body 150 with the main body 112 during the initial engagement and subsequent removable attachment of the portable body 150 with the main body 112 of the multifunctional center console 110. Furthermore, as a non-limiting example, the main body 112 and the portable body 150 of the multifunctional center console 110 may be configured such that, in order to removably attach the portable body 150 to the main body 112, the portable body 150 may be (1) at least partially inserted and positioned into the rear opening 132 extending through at least the rear portion 120 of the main body 112 and (2) further rotated towards the main body 112 in a generally upward and forward direction of the vehicle until the portable body 150 fully engages the main body 112 and is removably attached to the main body 112 (as shown in the sequence of FIG. 18 which illustrates the exemplary portable body 550, but such a sequence may be the same when removably attaching the portable body 150 to the main body 112). Additionally, when removing the portable body 150 from the main body 112, a sequence opposite (e.g. in reverse) to what is shown in FIG. 18 may take place. Furthermore, while the portable body 150 is shown and described as being removably attachable to at least the rear portion 120 of the main body 112 of the multifunctional center console 110, it is to be understood that the portable body 150 may be removably attachable to other portions of the main body 112, such as, but not limited to, the front potion 118 of the main body 112 (e.g. if the main body 112 is alternately configured), as may be understood by one of ordinary skill.

As shown in at least FIGS. 1 and 2, once the portable body 150 is removably attached to the rear portion 120 of the main body 112 of the multifunctional center console 110, at least some outer surfaces of the portable body 150 (e.g. outer surfaces of the first and second side portions 160, 162 and a top surface of the top portion 152) and at least some outer surfaces of the main body 112 (e.g. outer surfaces of the first and second side portions 122, 124 and a top surface of the movable armrest 128) may be disposed immediately adjacent and substantially flush relative to each other. Additionally, once the portable body 150 is removably attached to the rear portion 120 of the main body 112, a rearmost outer surface of the rear portion 158 of the portable body 150 may be disposed substantially rearward of the rear portion 120 of the main body 112, as shown in FIGS. 1 and 2. As such, an overall vertical height (in a vertical direction V of the vehicle) of the main body 112 of the multifunctional center console 110 and an overall vertical height (in the vertical direction V of the vehicle) of the portable body 150 of the multifunctional center console 110 may be substantially equal and an overall lateral width of the main body 112, in a side-to-side direction W of the vehicle, and an overall lateral width of the portable body 150, in the side-to-side direction W of the vehicle, may be substantially equal. In this manner, once the portable body 150 is removably attached to the rear portion 120 of the main body 112, the entire multifunctional center console 110 may appear more complete, integrated, consistent and aesthetically pleasing (e.g. having a fit and finish of smaller and tighter gaps), and may be packaged more efficiently within the interior of the vehicle.

Additionally, as shown in FIG. 17, the main body 112 and the portable body 150 of the multifunctional center console 110 may each include corresponding HVAC duct portions 134, 180 which may automatically align with and engage each other (e.g. via edge-sealed abutment) when the portable body 150 is removably attached to the main body 112 of the multifunctional center console 110. Additionally, the main body 112 and the portable body 150 of the multifunctional center console 110 may each include corresponding electrical connectors 136, 182 (e.g. mating electrical plugs) which may automatically align with and engage each other when the portable body 150 is removably attached to the main body 112 of the multifunctional center console 110. The electrical connectors 136, 182 are shown in FIGS. 16-17. As such, once the portable body 150 is removably attached to the rear portion 120 of the main body 112, the portable body 150 may receive electrical power from the vehicle (e.g. to provide electrical power to at least one functional feature thereof) and air flow/ventilation (e.g. temperature-controlled heated/cooled air) therethrough. While the portable body 150 is shown and described as having an HVAC duct portion 180 and an electrical connector 182, it is to be understood that another interchangeable portable body, such as, but not limited to, portable bodies 250, 350, 450, 550, may also include an HVAC duct and an electrical connector.

As further shown in FIG. 17, the multifunctional center console 110 may further include an electromagnetic locking/unlocking assembly 138, which may lock and selectively unlock the portable body 150 of the multifunctional center console 110 to and from the main body 112 of the multifunctional center console 110 once the portable body 150 is removably attached to the main body 112. As a non-limiting example, the electromagnetic locking/unlocking assembly 138 may include at least one movable electromagnetically-operated locking feature, such as electromagnetically-operated retractable locking pins 140, disposed at least partially within the main body 112 of the multifunctional center console 110, and at least one stationary receiving feature, such as a pin-receiving portion 142 with pin-receiving recesses 144. The pin-receiving portion 142 may be disposed on and protrude from the front portion 156 of the portable body 150 of the multifunctional center console 110.

In operation (e.g. during when the portable body 150 is being removably attached to the main body 112 of the multifunctional center console 110), the electromagnetically-operated retractable locking pins 140, which may be spring-biased to remain in an outwardly-projecting, non-retracted state when not electromagnetically-operated, may be configured to (1) slide on tapered surfaces 146 of the pin-receiving portion 142 as the portable body 150 initially engages the main body 112 and (2) further engage into the pin-receiving recesses 144 of the pin-receiving portion 142 when the portable body 150 fully engages the main body 112 to be removably attached to the main body 112, thereby automatically locking the portable body 150 to the main body 112 once the portable body 150 is removably attached to the main body 112. As such, the portable body 150 may be safely locked and secured to the main body 112 once removably attached to the main body 112.

The electromagnetically-operated retractable locking pins 140 of the electromagnetic locking/unlocking assembly 138 may be further configured to retract (e.g. electromagnetically by the energization of a coil, etc.) for a given period of time in response to a key or fob (not shown) being selectively placed in proximity to a wireless receiver 148 (e.g. a receiver chip, controller, controller board, etc. placed within the main body 112 and operatively connected (e.g. via a wire) with the electromagnetic locking/unlocking assembly 138), thereby disengaging the electromagnetically-operated retractable locking pins 140 from the pin-receiving recesses 144 of the pin-receiving portion 142 and selectively unlocking the portable body 150 from the main body 112 of the multifunctional center console 110. During the given period of time when the electromagnetically-operated retractable locking pins 140 are disengaged from the pin-receiving recesses 144 of the pin-receiving portion 142, the portable body 150 may be grasped (e.g. by the carrying handle 164) and moved away from the main body 112 (e.g. in a manner as previously described herein) so as to be completely detached and removed from the main body 112 of the multifunctional center console 110. The portable body 150, or another interchangeable portable body, such as, but not limited to, portable bodies 250, 350, 450, 550, may be removably attached, locked and unlocked to and from the main body 112 of the multifunctional center console 110 in the same aforementioned manner as described herein.

The disclosed multifunctional center console system 100, as shown and described herein, therefore provides at least one multifunctional center console 110 for a vehicle which may be highly customizable to provide an increased number of functional features and/or various combinations of functional features, such that the at least one multifunctional center console 110 is capable of sufficiently meeting or exceeding the particular needs and preferences of different drivers and/or passengers of the vehicle, thus further enhancing the overall in-vehicle experience for the different drivers and/or passengers.

While one or more exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

LIST OF NUMBERS

100 Center Console System
110 Center Console
112 Main Body
114 Top Portion
116 Bottom Portion
118 Front Portion
120 Rear Portion
122 First Side Portion
124 Second Side Portion
126 Support Structure
128 Movable Armrest
130 Cup Holders
132 Rear Opening 134 HVAC Duct Portion
136 Electrical Connector
138 Locking/Unlocking Assembly
140 Locking Pins
142 Pin-Receiving Portion
144 Pin-Receiving Recesses
146 Tapered Surfaces
148 Wireless Receiver
150 Portable Body
152 Top Portion
154 Bottom Portion
156 Front Portion
158 Rear Portion
160 First Side Portion
162 Second Side Portion
164 Carrying Handle
166 HVAC Vents
168 Wireless Charging Pad
170 USB Port
172 Storage Drawer
174 Side-Mounted Storage Pocket
176 Hidden Safe/Storage Compartment
178 Centering Portion
180 HVAC Duct Portion
182 Electrical Connector
250 Portable Body
252 Top Portion
254 Bottom Portion
256 Front Portion
258 Rear Portion
260 First Side Portion
262 Second Side Portion
264 Carrying Handle
266 Cargo-Retaining Strap
268 First Storage Compartment
270 Protective Liner
272 First Access Cover
274 Strap
276 Slot
278 Interior Component
280 Cargo Area
282 Second Storage Compartment
284 Netting
286 Second Access Cover
288 Interior Component
350 Portable Body
352 Top Portion
354 Bottom Portion
356 Front Portion
358 Rear Portion
360 First Side Portion
362 Second Side Portion
364 Wireless Charging Pad
366 HVAC Vents
368 Multimedia Interface
370 Audio Speakers
372 Storage Compartment
450 Portable Body
452 Top Portion
454 Bottom Portion
456 Front Portion
458 Rear Portion
460 First Side Portion
462 Second Side Portion
464 Carrying Handle
466 HVAC Vents
468 Wireless Charging Pad
470 Storage Compartment
472 Hidden Storage Compartment/Safe
474 Storage Pocket
476 Cargo-Retaining Band
550 Portable Body
552 Top Portion
554 Bottom Portion
556 Front Portion
558 Rear Portion
560 First Side Portion
562 Second Side Portion
564 Carrying Handle
566 HVAC Vents
568 Storage Compartment
600 Portable Storage Case
602 Side Portion
604 Side Portion
606 Side Portion
608 Strap
702 Utility Tray and Glove Box
704 Tray Portion
706 Glove Box Portion
708 Body
710 End Portion
712 Recess
714 Net Storage Compartment
800 Cooled Console
801 Body
802 Cooling System
804 Heat Pump
806 Peltier Unit
810 Hot Side Heat Sink
812 Cold Side Heat Sink
814 Double Sided Blower
816 Hot Side Blower Unit
818 Cold Side Blower Unit
820 Storage Compartment
822 Electric Motor
824 Inner Panel
826 Insulation
828 Outer Panel
830 Hinge Mechanism
D Direction

The invention claimed is:

1. A multifunctional center console system for a vehicle, the multifunctional center console system comprising:
a multifunctional center console including:
a main body configured to be mounted to a vehicle within an interior of the vehicle, the main body having at least a top portion, a bottom portion, a front portion, a rear portion and first and second side portions disposed between at least the front and rear portions; and
at least one portable body configured to be removably attached to the main body, the at least one portable body having at least a top portion, a bottom portion, a front portion, a rear portion and first and second side portions disposed between at least the front and rear portions of the at least one portable body, the at least one portable body including at least one functional feature;
wherein the main body and the at least one portable body of the multifunctional center console each include corresponding electrical connectors configured to align with and engage each other when the at least one portable body is removably attached to the main body of the multifunctional center console.

2. The multifunctional center console system according to claim 1, wherein the rear portion of the main body of the multifunctional center console is configured to receive at least a part of the at least one portable body of the multifunctional center console therein.

3. The multifunctional center console system according to claim 1, wherein a rear opening defined at the rear portion of the main body of the multifunctional center console is configured to receive at least a part of the front portion of the at least one portable body of the multifunctional center console therein.

4. The multifunctional center console system according to claim 1, wherein at least a part of the at least one portable body of the multifunctional center console is configured to be inserted into a rear opening extending through at least the rear portion of the main body of the multifunctional center console.

5. A multifunctional center console system for a vehicle, the multifunctional center console system comprising:
   a multifunctional center console including:
      a main body configured to be mounted to a vehicle within an interior of the vehicle, the main body having at least a top portion, a bottom portion, a front portion, a rear portion and first and second side portions disposed between at least the front and rear portions; and
      at least one portable body configured to be removably attached to the main body, the at least one portable body having at least a top portion, a bottom portion, a front portion, a rear portion and first and second side portions disposed between at least the front and rear portions of the at least one portable body, the at least one portable body including at least one functional feature;
      wherein the main body and the at least one portable body of the multifunctional center console are configured such that, in order to removably attach the at least one portable body to the main body, the least one portable body is configured to be (1) at least partially inserted and positioned into a rear opening extending through at least the rear portion of the main body and (2) further rotated towards the main body in a generally upward and forward direction of the vehicle until the at least one portable body is removably attached to the main body.

6. The multifunctional center console system according to claim 1, wherein the front portion of the at least one portable body of the multifunctional center console is configured to be removably attached to the rear portion of the main body of the multifunctional center console such that, when the front portion of the at least one portable body is removably attached to the rear portion of the main body, at least some outer surfaces of the at least one portable body and at least some outer surfaces of the main body are disposed immediately adjacent and substantially flush relative to each other.

7. The multifunctional center console system according to claim 1, wherein the front portion of the at least one portable body of the multifunctional center console is configured to be removably attached to the rear portion of the main body of the multifunctional center console such that, when the front portion of the at least one portable body is removably attached to the rear portion of the main body, a rearmost outer surface of the rear portion of the at least one portable body is disposed substantially rearward of the rear portion of the main body.

8. The multifunctional center console system according to claim 1, wherein an overall vertical height of the main body of the multifunctional center console and an overall vertical height of the at least one portable body of the multifunctional center console are substantially equal.

9. The multifunctional center console system according to claim 1, wherein an overall lateral width of the main body of the multifunctional center console, in a side-to-side direction of the vehicle, and an overall lateral width of the at least one portable body of the multifunctional center console, in the side-to-side direction of the vehicle, are substantially equal.

10. The multifunctional center console system according to claim 1, wherein the main body of the multifunctional center console includes at least one functional feature which is different from the at least one functional feature of the at least one portable body of the multifunctional center console.

11. The multifunctional center console system according to claim 10, wherein the at least one functional feature of the main body of the multifunctional center console comprises at least one of an armrest, a cup holder, a storage compartment, a coin holder, ambient lighting, LED lighting, a vehicle sensor, a vehicle HVAC component, a vehicle electrical component, a vehicle gear selector, a vehicle infotainment system
   control feature, a vehicle audio/video component, a speaker, a portable electronic device holder, a USB port, an electrical receptacle, a wireless charging pad, a coffee maker, a utility tray, a utility table, a docking system for mobile devices, an integrated vacuum device, and a wireless power transmission system antenna array.

12. The multifunctional center console system according to claim 10, wherein the at least one functional feature of the main body of the multifunctional center console comprises at least one movable armrest disposed at or near at least the top portion of the main body.

13. The multifunctional center console system according to claim 1, wherein the at least one functional feature of the at least one portable body of the multifunctional center console comprises at least one of a carrying handle, a cup holder, a side-mounted storage pocket, a cargo-retaining strap, an elastic cargo-retaining band, a storage compartment, a lockable/unlockable safe, a storage drawer, an openable/closable access cover, ambient lighting, LED lighting, a vehicle HVAC component, a vehicle HVAC vent, a climate control feature, a heated seat control feature, a vehicle electrical component, a vehicle audio/video component, a speaker, a display screen, a vehicle infotainment system control feature, a portable electronic device holder, a USB port, an electrical receptacle, a wireless charging pad, a coffee maker, a utility tray, a utility table, a docking system for mobile devices, an integrated vacuum device, and a wireless power transmission system antenna array.

14. A multifunctional center console system for a vehicle, the multifunctional center console system comprising:
   a multifunctional center console including:
      a main body configured to be mounted to a vehicle within an interior of the vehicle, the main body having at least a top portion, a bottom portion, a front portion, a rear portion and first and second side portions disposed between at least the front and rear portions; and
      at least one portable body configured to be removably attached to the main body, the at least one portable body having at least a top portion, a bottom portion, a front portion, a rear portion and first and second side portions disposed between at least the front and rear portions of the at least one portable body, the at least one portable body including at least one functional feature;

wherein the at least one functional feature of the at least one portable body of the multifunctional center console is configured to receive electrical power and be fully functional when the at least one portable body is removed from the main body of the multifunctional center console, the at least one functional feature of the at least one portable body further configured to receive the electrical power from at least one of an external power source electrically connected to the at least one portable body and an internal rechargeable power source provided at least partially within the at least one portable body.

15. The multifunctional center console system according to claim 1, wherein the at least one functional feature of the at least one portable body of the multifunctional center console comprises at least one storage compartment including at least one protective liner installed therein, the at least one protective liner configured to be selectively removed from the at least one storage compartment so as to cover and protect at least one interior component and/or at least one cargo area within the interior of the vehicle.

16. A multifunctional center console system for a vehicle, the multifunctional center console system comprising:
a multifunctional center console including:
a main body configured to be mounted to a vehicle within an interior of the vehicle, the main body having at least a top portion, a bottom portion, a front portion, a rear portion and first and second side portions disposed between at least the front and rear portions; and
at least one portable body configured to be removably attached to the main body, the at least one portable body having at least a top portion, a bottom portion, a front portion, a rear portion and first and second side portions disposed between at least the front and rear portions of the at least one portable body, the at least one portable body including at least one functional feature;
wherein the at least one functional feature of the at least one portable body of the multifunctional center console comprises at least one storage compartment including netting installed therein, the netting configured to be selectively removed from the at least one storage compartment so as to be removably attachable to at least one interior component of the vehicle.

17. A multifunctional center console system for a vehicle, the multifunctional center console system comprising:
a multifunctional center console including:
a main body configured to be mounted to a vehicle within an interior of the vehicle, the main body having at least a top portion, a bottom portion, a front portion, a rear portion and first and second side portions disposed between at least the front and rear portions; and
at least one portable body configured to be removably attached to the main body, the at least one portable body having at least a top portion, a bottom portion, a front portion, a rear portion and first and second side portions disposed between at least the front and rear portions of the at least one portable body, the at least one portable body including at least one functional feature;

wherein the main body and the at least one portable body of the multifunctional center console each include corresponding HVAC duct portions configured to align with and engage each other when the at least one portable body is removably attached to the main body of the multifunctional center console.

18. The multifunctional center console system according to claim 1, wherein the multifunctional center console further includes a locking/unlocking assembly configured to lock and selectively unlock the at least one portable body of the multifunctional center console to and from the main body of the multifunctional center console when the at least one portable body is removably attached to the main body, the locking/unlocking assembly including at least one movable locking feature disposed at least partially within the main body and at least one stationary receiving feature disposed on the at least one portable body, the at least one movable locking feature configured to engage the at least one stationary receiving feature when the at least one portable body is removably attached to the main body, thereby locking the at least one portable body to the main body.

19. The multifunctional center console system according to claim 1, wherein the multifunctional center console further includes an electromagnetic locking/unlocking assembly configured to lock and selectively unlock the at least one portable body of the multifunctional center console to and from the main body of the multifunctional center console when the at least one portable body is removably attached to the main body.

20. The multifunctional center console system according to claim 19, wherein the electromagnetic locking/unlocking assembly includes at least one movable electromagnetically-operated locking feature disposed at least partially within the main body of the multifunctional center console and at least one stationary receiving feature disposed on the at least one portable body of the multifunctional center console.

21. The multifunctional center console system according to claim 20, wherein the at least one movable electromagnetically-operated locking feature is configured to (1) slide on the at least one stationary receiving feature as the at least one portable body initially engages the main body and (2) further engage into the at least one stationary receiving feature when the at least one portable body fully engages the main body to be removably attached to the main body, thereby locking the at least one portable body to the main body when the at least one portable body is removably attached to the main body.

22. The multifunctional center console system according to claim 21, wherein the at least one movable electromagnetically-operated locking feature of the electromagnetic locking/unlocking assembly is further configured to retract in response to a key or fob being selectively placed in proximity to a wireless receiver operatively connected with the electromagnetic locking/unlocking assembly, thereby disengaging the at least one movable electromagnetically-operated locking feature from the at least one stationary receiving feature and selectively unlocking the at least one portable body of the multifunctional center console from the main body of the multifunctional center console.

23. The multifunctional center console system according to claim 19, wherein the electromagnetic locking/unlocking assembly is further configured to selectively unlock the at least one portable body of the multifunctional center console from the main body of the multifunctional center console in response to a key or fob being selectively placed in proximity to a wireless receiver operatively connected with the electromagnetic locking/unlocking assembly.

24. The multifunctional center console system according to claim 1, further comprising at least one portable storage case for holding, storing and/or transporting the at least one portable body of the multifunctional center console when the at least one portable body is removed from the main body of the multifunctional center console.

25. The multifunctional center console system according to claim 1, wherein the at least one portable body of the multifunctional center console comprises a plurality of interchangeable portable bodies, each of the plurality of interchangeable portable bodies of the multifunctional center console configured to be removably attached, one at a given time, to the main body of the multifunctional center console, and each of the plurality of interchangeable portable bodies including at least one functional feature.

26. The multifunctional center console system according to claim 25, further comprising at least one portable storage case for holding, storing and/or transporting at least one of the plurality of interchangeable portable bodies of the multifunctional center console when the at least one of the plurality of interchangeable portable bodies is removed from the main body of the multifunctional center console.

\* \* \* \* \*